United States Patent
Iwasaki et al.

(10) Patent No.: US 8,806,597 B2
(45) Date of Patent: Aug. 12, 2014

(54) INFORMATION PROCESSING SYSTEM, INFORMATION PROCESSING DEVICE, SERVER DEVICE, AND METHOD

(75) Inventors: Manabu Iwasaki, Kanagawa (JP); Shin Ohtake, Kanagawa (JP); Hiroyuki Hasegawa, Kanagawa (JP)

(73) Assignee: Fuji Xerox Co., Ltd., Tokyo (JP)

(*) Notice: Subject to any disclaimer, the term of this patent is extended or adjusted under 35 U.S.C. 154(b) by 181 days.

(21) Appl. No.: 13/233,819

(22) Filed: Sep. 15, 2011

(65) Prior Publication Data

US 2012/0222101 A1 Aug. 30, 2012

(30) Foreign Application Priority Data

Feb. 24, 2011 (JP) ................................ 2011-038245

(51) Int. Cl.
| | |
|---|---|
| G06F 7/04 | (2006.01) |
| G06F 15/16 | (2006.01) |
| G06F 17/30 | (2006.01) |
| H04L 29/06 | (2006.01) |
| G06F 21/30 | (2013.01) |
| G06F 21/31 | (2013.01) |
| G06F 21/34 | (2013.01) |
| G06F 21/36 | (2013.01) |
| H04L 9/32 | (2006.01) |
| H04L 9/36 | (2006.01) |

(52) U.S. Cl.
CPC ............. G06F 21/30 (2013.01); G06F 21/31 (2013.01); *G06F 21/34* (2013.01); *G06F 21/36* (2013.01); *G06F 2221/21* (2013.01); *G06F 2221/2103* (2013.01); *G06F 2221/2133* (2013.01); *H04L 63/0823* (2013.01); *H04L 9/32* (2013.01); *H04L 9/36* (2013.01)
USPC ................... 726/7; 726/17; 726/19; 713/182

(58) Field of Classification Search
CPC ......... G06F 21/30; G06F 21/31; G06F 21/34; G06F 21/36; G06F 2221/21; G06F 2221/2103; G06F 2221/2133; H04L 63/0823; H04L 9/32; H04L 9/36
USPC ........................................ 726/2–21; 713/182
See application file for complete search history.

(56) References Cited

U.S. PATENT DOCUMENTS 7,533,419 B2 * 5/2009 Paya et al. ........................ 726/26
8,184,641 B2 * 5/2012 Alt et al. ................... 370/395.54

(Continued)

FOREIGN PATENT DOCUMENTS

| EP | 1603374 A1 | 12/2005 |
| JP | 11-177615 A | 7/1999 |

(Continued)

*Primary Examiner* — Jeffrey Pwu
*Assistant Examiner* — Jayesh Jhaveri
(74) *Attorney, Agent, or Firm* — Sughrue Mion, PLLC

(57) ABSTRACT

An information processing system including an information processing device connected to a first communication network, a terminal device connected to the first communication network, and a server device connected to a second communication network. The server device includes a receiving unit, a first request unit, and a providing unit. The receiving unit receives an instruction from the terminal device to provide the information processing device with a predetermined service. The first request unit presents a test to the information processing device to authenticate whether or not the information processing device is being operated by a human. The providing unit provides the information processing device with the service in accordance with the instruction. The terminal device includes an instruction unit and a response unit. The instruction unit sends the instruction to the server device. The response unit makes a response to the test on behalf of the information processing device.

15 Claims, 20 Drawing Sheets

(56) References Cited

U.S. PATENT DOCUMENTS

| | | | | |
|---|---|---|---|---|
| 8,522,318 B2* | 8/2013 | Vank et al. | | 726/4 |
| 2007/0186273 A1* | 8/2007 | Carpy et al. | | 726/2 |
| 2009/0070864 A1* | 3/2009 | Nishida | | 726/7 |
| 2009/0077628 A1* | 3/2009 | Elson et al. | | 726/2 |
| 2009/0232351 A1* | 9/2009 | Kagitani et al. | | 382/100 |
| 2009/0328178 A1* | 12/2009 | McDaniel et al. | | 726/9 |
| 2010/0037147 A1* | 2/2010 | Champion et al. | | 715/751 |
| 2010/0058064 A1* | 3/2010 | Kirovski et al. | | 713/176 |
| 2010/0174827 A1* | 7/2010 | Nakayama | | 709/238 |
| 2010/0185858 A1* | 7/2010 | Nishimi et al. | | 713/168 |
| 2010/0325427 A1* | 12/2010 | Ekberg et al. | | 713/156 |
| 2010/0333176 A1* | 12/2010 | Vank et al. | | 726/3 |
| 2011/0113147 A1* | 5/2011 | Poluri et al. | | 709/229 |

FOREIGN PATENT DOCUMENTS

| | | |
|---|---|---|
| JP | 2007-264835 A | 10/2007 |
| JP | 2010-131801 A | 6/2010 |

* cited by examiner

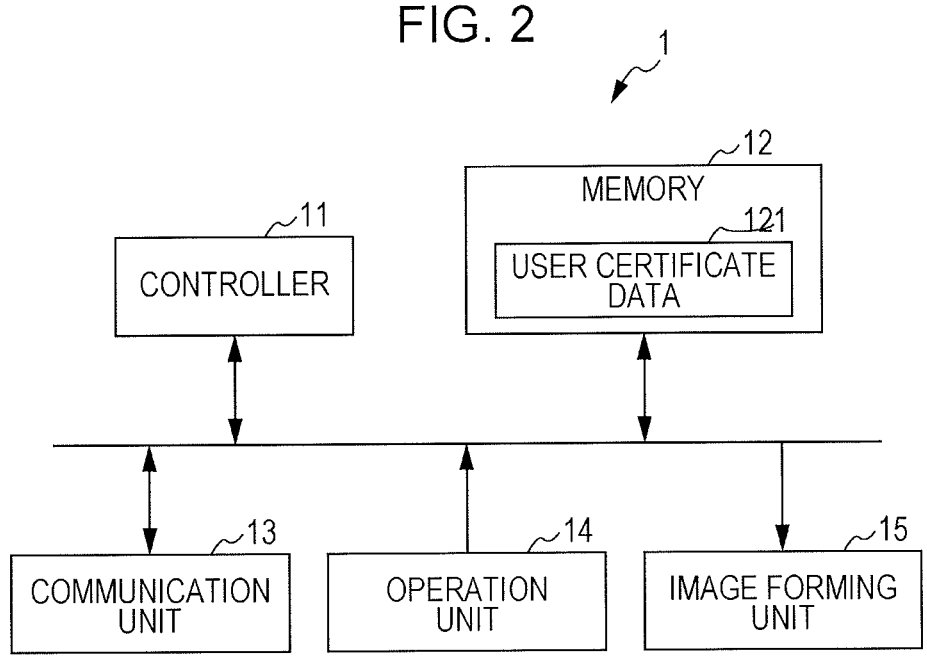
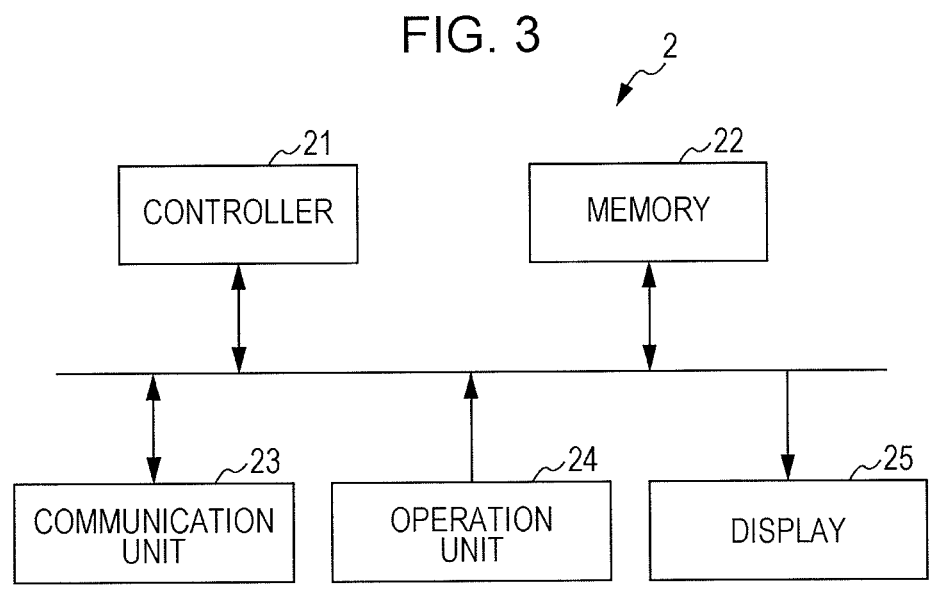

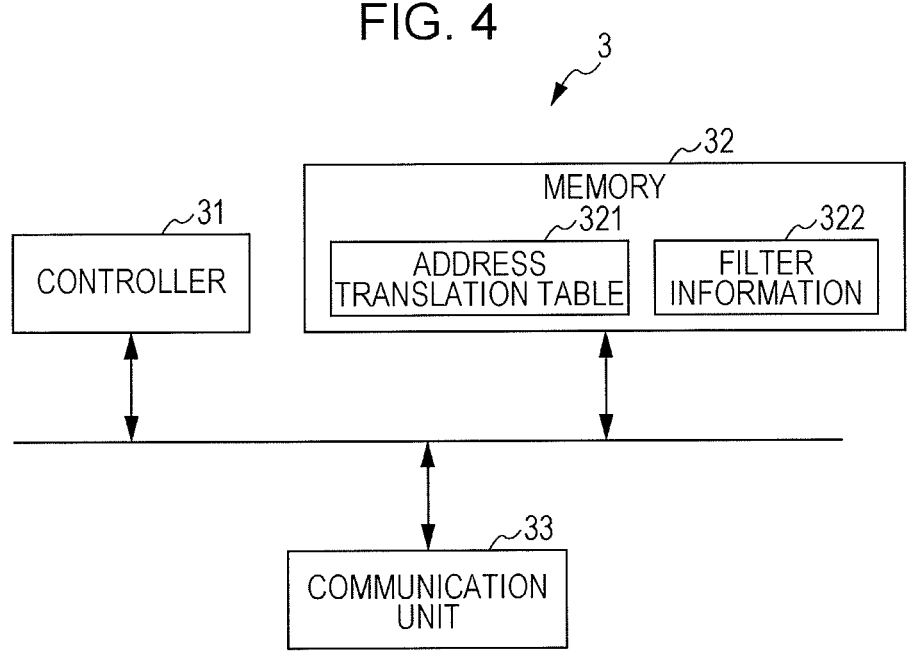

| USER ID | PASSWORD |
|---------|----------|
| U001 | bz87 ⋯ |
| U002 | Fh9Q ⋯ |
| ⋮ | ⋮ |

INFORMATION PROCESSING SYSTEM, INFORMATION PROCESSING DEVICE, SERVER DEVICE, AND METHOD

CROSS-REFERENCE TO RELATED APPLICATIONS

This application is based on and claims priority under 35 USC 119 from Japanese Patent Application No. 2011-038245 filed Feb. 24, 2011.

BACKGROUND (i) Technical Field

The present invention relates to an information processing system, an information processing device, a server device, and a method.

(ii) Related Art

In recent years, a cloud computing model (hereinafter referred to simply as a "cloud") serving as a model for providing services via the Internet has been put into practical use. The use of computer resources residing in a cloud allows users to access services without holding the computer resources.

Services provided using the cloud consume computer resources in the cloud. Since some services are provided in return for user payment, it is required that recipients of such services be authorized (or authentic). In order to ensure that a user who is to obtain a service not be a third party that spoofs the address of the user, user identity authentication is performed using a combination of identification information about the user and secret information such as a password that only the user knows. In terms of security, furthermore, it may be requested that a human operator use a device that is to receive the service.

The services that users wish to access through the cloud are not necessarily received at devices the users are directly operating. Users often own plural devices, and some of the devices owned by users may receive only operation instructions transmitted from other devices via, for example, a local area network.

SUMMARY

According to an aspect of the invention, there is provided an information processing system including an information processing device, a terminal device, and a server device. The information processing device is connected to a first communication network. The terminal device is connected to the first communication network. The server device is connected to a second communication network different from the first communication network, and communicates with the information processing device and the terminal device. The server device includes a receiving unit, a first request unit, and a providing unit. The receiving unit receives an instruction from the terminal device to provide the information processing device with a predetermined service. The first request unit presents a test to the information processing device to authenticate whether or not the information processing device is being operated by a human, and sends a request to make a response to the test to the information processing device. The providing unit provides the information processing device with the service in accordance with the instruction received by the receiving unit if a device that has sent a response to the first request unit is being operated by a human. The terminal device includes an instruction unit and a response unit. The instruction unit sends the instruction to the server device. The response unit makes a response to the test on behalf of the information processing device in accordance with a user operation if the information processing device is requested by the first request unit to make a response to the test.

BRIEF DESCRIPTION OF THE DRAWINGS

Exemplary embodiment(s) of the present invention will be described in detail based on the following figures, wherein:

FIG. 2 illustrates the configuration of an image forming device according to the first exemplary embodiment;

FIG. 3 illustrates the configuration of a terminal device according to the first exemplary embodiment;

FIG. 4 illustrates the configuration of a relay device according to the first exemplary embodiment;

FIG. 5 illustrates an example of an address translation table according to the first exemplary embodiment;

DETAILED DESCRIPTION

1. First Exemplary Embodiment

A first exemplary embodiment of the present invention will be described hereinafter.

1-1. Configuration

1-1-1. Overall Configuration of Image Forming System

Figure 1:
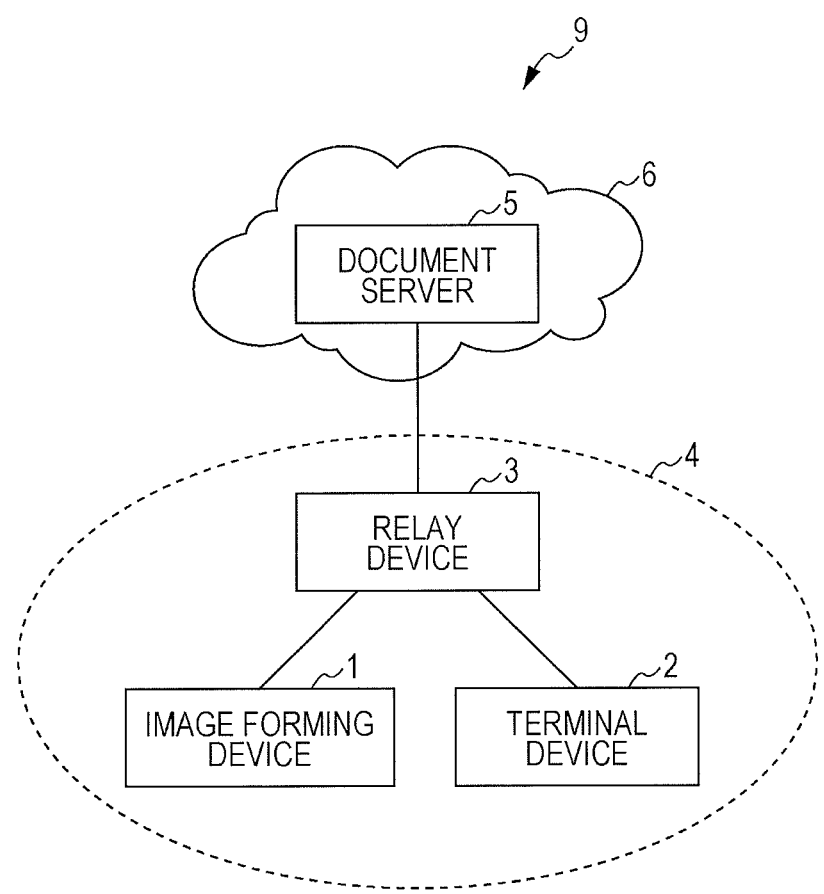
FIG. 1 illustrates the overall configuration of an image forming system according to a first exemplary embodiment.

FIG. 1 illustrates the overall configuration of an image forming system 9 according to the first exemplary embodiment. The image forming system 9 is an example of an information processing system, and includes a local area network (LAN) 4 including information processing resources to be directly used by users, and a cloud 6 that provides an information processing resource via the Internet in accordance with a request given from a user. The LAN 4 includes an image forming device 1, a terminal device 2, and a relay device 3. The cloud 6 includes a document server 5 that provides plural services regarding document creation. The LAN 4 is an example of a first communication network, and the cloud 6 is an example of a second communication network different from the first communication network. The image forming device 1 is an example of an information processing device connected to the first communication network, and the terminal device 2 is an example of a terminal device connected to the first communication network. The document server 5 is an example of a server device that is connected to the second communication network different from the first communication network and that communicates with the information processing device and the terminal device.

1-1-2. Image Forming Device

FIG. 2 illustrates the configuration of the image forming device 1 according to the first exemplary embodiment. A controller 11 includes a central processing unit (CPU), a read only memory (ROM), a random access memory (RAM), and any other suitable device. The CPU reads a bootloader stored in the ROM or a computer program stored in a memory (hereinafter referred to simply as a "program") to the RAM and executes the program to control the individual units of the image forming device 1. The memory 12 may be a large-capacity memory such as a hard disk drive or an electrically erasable programmable read only memory (EEPROM), and stores the program read by the CPU of the controller 11. The memory 12 also stores user certificate data 121. The user certificate data 121 may be data in which user identification information (hereinafter referred to as the "user ID") identifying a user who is authorized to use the image forming device 1 is associated with a password for authenticating the user.

A communication unit 13 may be an interface that communicates control information and the like with the terminal device 2 or the document server 5 via the relay device 3. Examples of the communication unit 13 include various modems, wireless communication circuits complying with the International Mobile Telecommunications 2000 (IMT-2000), serial interfaces complying with the universal serial bus (USB) standard, and wireless interfaces complying with infrared protocols such as infrared data association (IrDA) and Bluetooth (registered trademark). That is, the communication unit 13 is an example of a communication unit that communicates with a relay device that relays communication between a terminal device connected to a first communication network and a server device connected to a second communication network different from the first communication network.

An operation unit 14 includes operation buttons and any other suitable tools for entering various instructions. The operation unit 14 receives an operation of a user, and supplies a signal corresponding to the operation to the controller 11. An image forming unit 15 forms an image on a recording medium such as a sheet of paper in accordance with image data representing an image, which is stored in the memory 12 or the RAM of the controller 11. That is, the image forming unit 15 is an example of an image forming unit that forms an image represented by provided image data on a recording medium. Specifically, the image forming unit 15 includes an exposure device, a photoconductor, a developing device, a transfer device, and a transport device. The exposure device irradiates the photoconductor with laser light corresponding to the image data to form an electrostatic latent image, and the developing device supplies toner onto the surface of the photoconductor to develop the electrostatic latent image. Then, the transfer device transfers a toner image formed on the photoconductor onto a recording medium such as a sheet of paper transported by the transport device.

1-1-3. Terminal Device

FIG. 3 illustrates the configuration of the terminal device 2 according to the first exemplary embodiment. A controller 21 includes a CPU, a ROM, a RAM, and any other suitable device, and controls the individual units of the terminal device 2. A memory 22 may be a large-capacity memory such as a hard disk drive, and stores the program used by the controller 21. A communication unit 23 may be an interface that communicates control information and the like with the relay device 3. An operation unit 24 includes operation buttons and any other suitable tools for entering various instructions. The operation unit 24 receives an operation of a user, and supplies a signal corresponding to the operation to the controller 21. A display 25 displays a screen for editing a document indicated by document data, an interactive window for instructing an operation, or the like in accordance with an instruction from the controller 21. The display 25 may be, for example, a liquid crystal display element or the like.

1-1-4. Relay Device

FIG. 4 illustrates the configuration of the relay device 3 according to the first exemplary embodiment. The relay device 3 is an example of a relay device that relays communication among the information processing device, the terminal device, and the server device. A controller 31 includes a CPU, a ROM, a RAM, and any other suitable device, and controls the individual units of the relay device 3. A memory 32 may be a large-capacity memory such as a hard disk drive, and stores the program used by the controller 31. A communication unit 33 may be an interface that communicates control information and the like with the image forming device 1 or the terminal device 2 in the LAN 4 and the document server 5 in the cloud 6.

The memory 32 also stores an address translation table 321 and filter information 322. The address translation table 321 may be a table in which an address/port pair having a local Internet protocol (IP) address and a port number is associated with an address/port pair having a global IP address and a port number. Local IP addresses are addresses that are used only within the LAN 4, and global IP addresses are addresses for specifying devices accessed via the Internet or programs and the like running on the devices. FIG. 5 illustrates an example of the address translation table 321 according to the first exemplary embodiment. In the address translation table 321, IP addresses comply with the Internet Protocol version 4 (IPv4), and, for example, the address/port pair of local IP address "10.10.1.1" and port number "80" is associated with the address/port pair of global IP address "123.123.1.xxx" and port number "49152".

The controller 31 of the relay device 3 refers to the address translation table 321 to perform network address translation based on Network Address Translation (NAT), Network Address Port Translation (NAPT), or the like. Specifically, when relaying a packet complying with a communication protocol such as Transmission Control Protocol/Internet Protocol (TCP/IP), the controller 31 converts the IP address written in the header of the packet. For example, when a packet is transmitted from the LAN 4 to the cloud 6, "10.10.1.1:80" indicating the transmission source is translated into "123.123.1.xxx:49152". When a packet is transmitted from the cloud 6 to the LAN 4, "123.123.1.xxx:49152" indicating the transmission destination is translated into "10.10.1.1:80". Accordingly, a device in the LAN 4 is accessed from the Internet by referring to the global IP address corresponding to the local IP address.

The filter information 322 includes conditions under which the relay device 3 allows communication. For example, if the filter information 322 includes the condition that "a packet for requesting the start of communication via Hypertext Transfer Protocol (HTTP), which is forwarded to a device in the LAN 4 from a device outside the LAN 4, is to be rejected or discarded", the controller 31 of the relay device 3 refers to the condition to check the header or the like of the packet to be relayed. Upon detection of a packet for requesting the start of communication via HTTP, which is forwarded from the cloud 6 to the LAN 4, the controller 31 rejects or discards the packet. Therefore, access to devices in the LAN 4 from the Internet may be limited.

1-1-5. Document Server

Figures 6, 7:
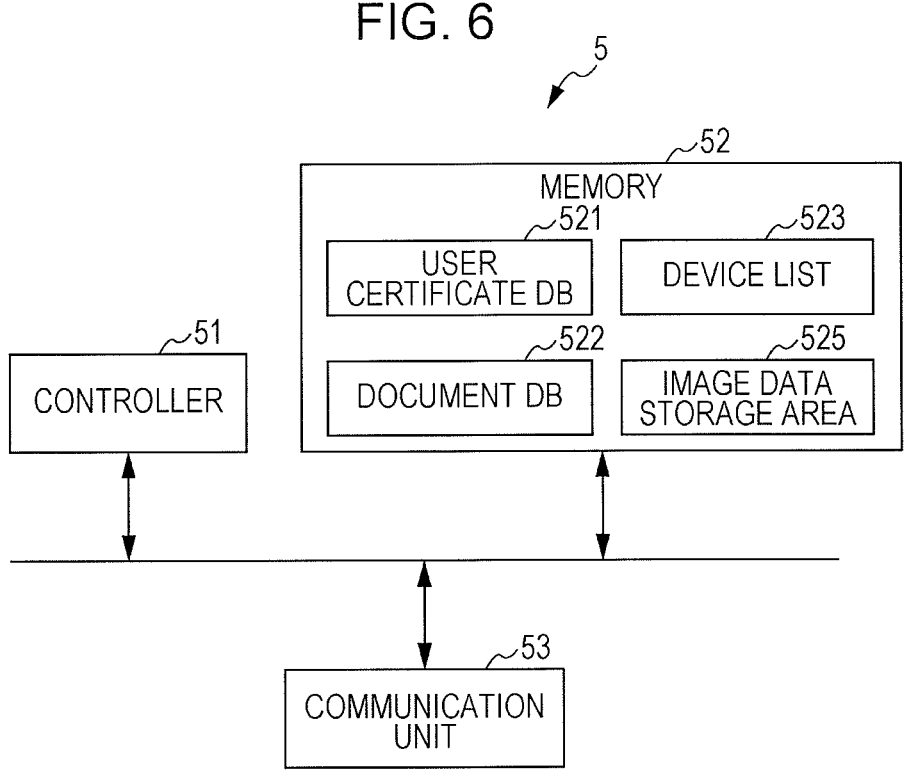
FIG. 6 illustrates the configuration of a document server according to the first exemplary embodiment.
FIG. 7 illustrates an example of a user certificate database (DB) according to the first exemplary embodiment.

FIG. 6 illustrates the configuration of the document server 5 according to the first exemplary embodiment. A controller 51 includes a CPU, a ROM, a RAM, and any other suitable device, and controls the individual units of the document server 5. Further, the controller 51 executes a program read from a memory 52 to implement various functions. The functions implemented by the controller 51 include a "human interactive proof (HIP) based authentication function" in which it is determined whether or not a device that has accessed the document server 5 is being operated by a human.

A HIP is a proof that guarantees that the accessing party is a human. In HIP-based authentication, specifically, a server provides a client device with an interactive test called a CAPTCHA, which stands for Completely Automated Public Turing Test to Tell Computers and Humans Apart, a response to the test is sent from the client device, and the HIP-based authentication is based on the response. CAPTCHA is a test that provides a problem easy enough for humans to solve but difficult for computers (machines) to solve, and, for example, a character string randomly created and modified so that it is difficult to recognize the character string using optical character recognition (OCR) or other pattern recognition algorithms. The document server 5 may prevent or reduce non-human access such as that attempted by robots, bots, and crawlers by causing a client device to transmit a HIP and by authenticating it.

The memory 52 may be a large-capacity memory such as a hard disk drive, and stores the program used by the controller 51. A communication unit 53 may be an interface that communicates control information and the like with another device on the Internet, the relay device 3 in the LAN 4, or the like.

The memory 52 further includes a user certificate database (DB) 521, a document DB 522, a device list 523, and an image data storage area 525.

The user certificate DB 521 stores a user ID identifying a user who uses the document server 5 and a password for authenticating the user in association with each other. FIG. 7 illustrates an example of the user certificate DB 521 according to the first exemplary embodiment. For example, in the user certificate DB 521 illustrated in FIG. 7, user ID "U001" is associated with password "bz87 . . . ".

Figure 8:
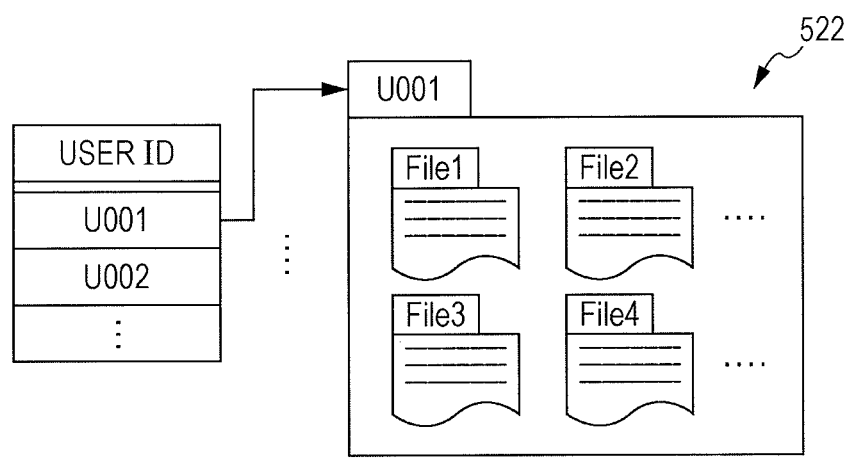
FIG. 8 illustrates an example of a document DB according to the first exemplary embodiment.

The document DB 522 stores, for each user, document data created by the user and edited. FIG. 8 illustrates an example of the document DB 522 according to the first exemplary embodiment. In the document DB 522 illustrated in FIG. 8, user ID "U001" is associated with files storing the document data, e.g., "File 1", "File 2", "File 3", "File 4", etc. The document data may be data created by a user to edit a document, and may include the history of editing the document.

Figure 9:
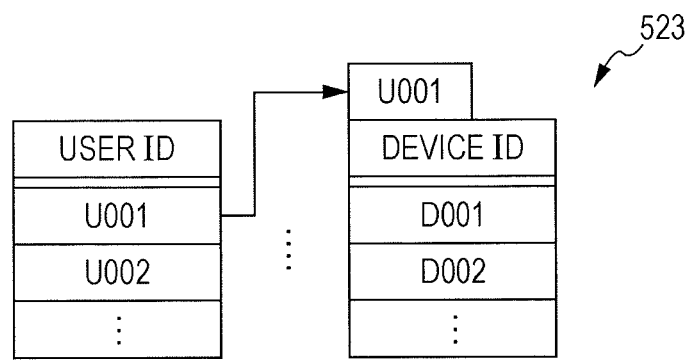
FIG. 9 illustrates an example of a device list according to the first exemplary embodiment.

The device list 523 is a list of devices used by each user who uses the document server 5. FIG. 9 illustrates an example of the device list 523 according to the first exemplary embodiment. In the device list 523 illustrated in FIG. 9, user ID "U001" is associated with pieces of device identification information (hereinafter referred to as device IDs) identifying devices, e.g., "D001", "D002", etc.

The image data storage area 525 may be an area in which image data generated by the controller 51 is stored. The image data may be image data representing an image corresponding to specific document data stored in the document DB 522, and is generated to form an image on a recording medium using the image forming device 1. The image data may be, for example, Portable Document Format (PDF) data.

1-1-6. Functional Configuration of Image Forming Device

Figure 10:
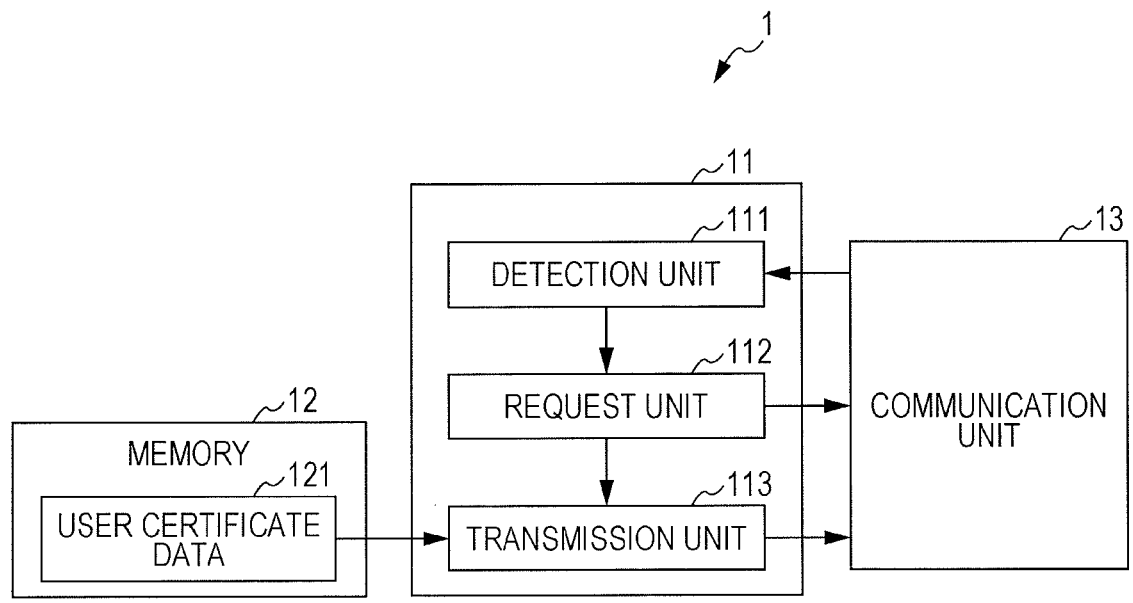
FIG. 10 illustrates the functional configuration of the image forming device according to the first exemplary embodiment.

FIG. 10 illustrates the functional configuration of the image forming device 1 according to the first exemplary embodiment. The controller 11 of the image forming device 1 executes the program described above to function as a detection unit 111, a request unit 112, and a transmission unit 113. The detection unit 111 is a unit that detects a HIP rejection notification sent from the document server 5 from the communication received by the communication unit 13. The request unit 112 is a unit that requests the terminal device 2 via the communication unit 13 to send a HIP, which is to be authenticated by the document server 5, by proxy. That is, the request unit 112 is an example of a request unit that, when a test for authenticating whether or not the image forming device 1 is being operated by a human is presented to the image forming device 1 or when the image forming device 1 receives a request for making a response to the test by proxy, requests the terminal device via the communication unit to make a proxy response to the test. The transmission unit 113 is a unit that transmits the user certificate data 121 stored in the memory 12 to the document server 5 via the communication unit 13 as a user certificate.

1-2. Operations

Next, the operation of the image forming system 9 according to the first exemplary embodiment of the present invention will be described.

1-2-1. Editing Operation

Figure 11:
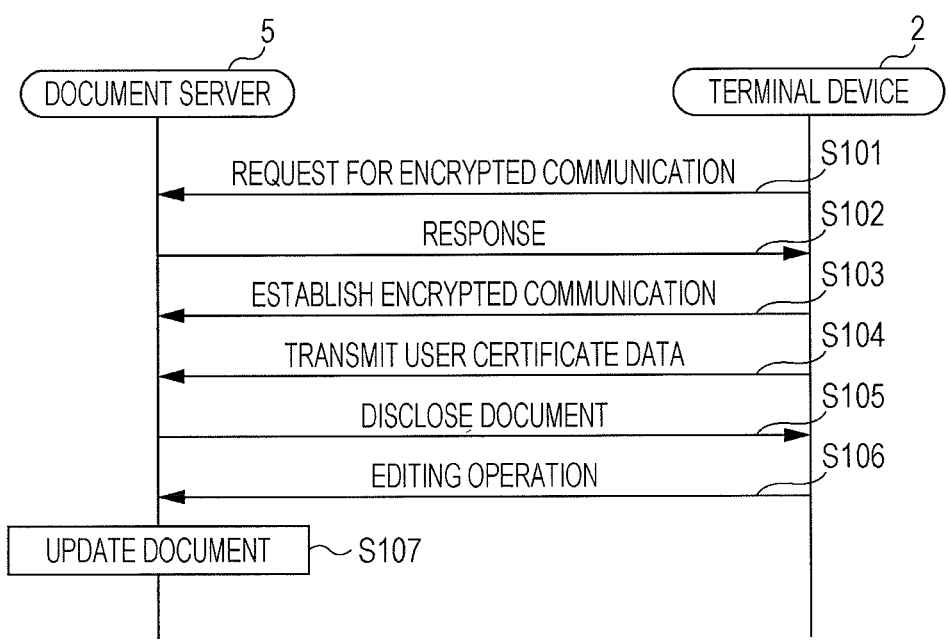
FIG. 11 is a flow diagram illustrating an operation of editing document data according to the first exemplary embodiment.

FIG. 11 is a flow diagram illustrating an operation in which the terminal device 2 edits document data stored in the document server 5 according to the first exemplary embodiment. The terminal device 2 requests the document server 5 in the cloud 6 via the relay device 3 to perform encrypted communication (step S101). In response to the request for performing encrypted communication, the document server 5 transmits the server certificate thereof with an electronic signature certified by, for example, a predetermined certificate authority to the terminal device 2 (step S102). The terminal device 2 acquires the public key of the certificate authority described above, and authenticates the received server certificate using the public key. Upon acceptance of the server certificate, the terminal device 2 generates a pseudo-random number, encrypts the pseudo-random number using the public key of the document server 5 included in the server certificate, and transmits the pseudo-random number to the document server 5 (step S103).

The document server 5 decodes the encrypted pseudo-random number using the private key thereof. Therefore, both the terminal device 2 and the document server 5 own the common pseudo-random number. Each of the terminal device 2 and the document server 5 generates a common key from the pseudo-random number so that encrypted communication based on a communication protocol such as HTTP over Secure Sockets Layer/Transport Layer Security (SSL/TLS) may be established between the terminal device 2 and the document server 5. In the following operation, the illustration of the procedure for establishing encrypted communication is omitted.

Next, the terminal device 2 transmits the user certificate data 121 stored in the memory 12 to the document server 5 as a user certificate (step S104). The document server 5 receives the user certificate data 121, and matches the user certificate data 121 with the content stored in the user certificate DB 521 to perform user identity authentication. Upon acceptance of the user certificate data 121, the document server 5 acquires document data from the document file associated with the user ID included in the user certificate data 121 from the document DB 522, and transmits the document data to the terminal device 2 to disclose the document (step S105). The terminal device 2 transmits the editing operation of the user to the document server 5 (step S106). Upon receipt of the editing operation, the document server 5 updates the document data in accordance with the editing operation (step S107).

1-2-2. Image Forming Operation

Figure 12:
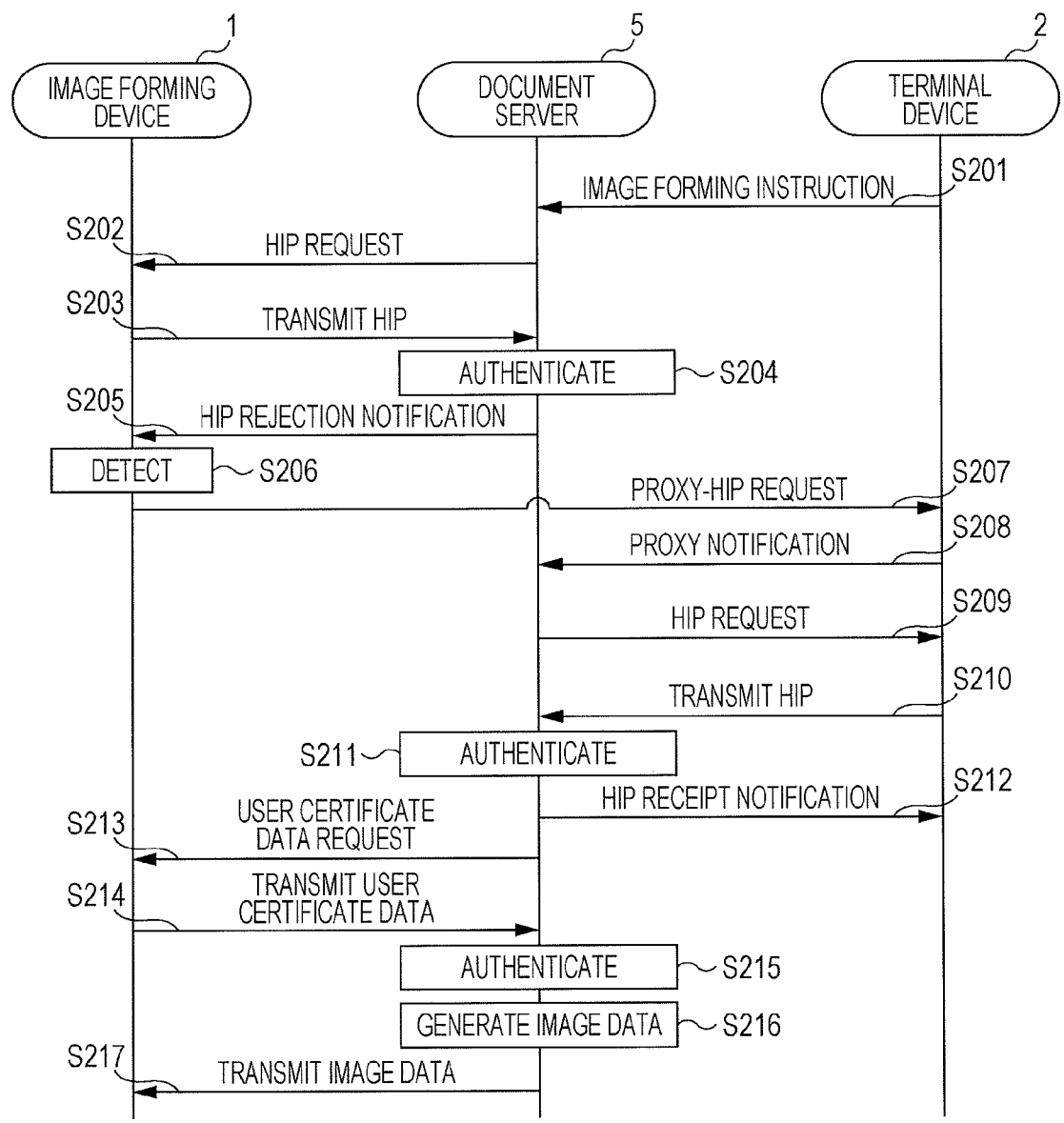
FIG. 12 is a flow diagram illustrating an operation of forming an image according to the first exemplary embodiment.

FIG. 12 is a flow diagram illustrating an operation in which the document server 5 causes the image forming device 1 to form an image corresponding to document data specified by the terminal device 2 according to the first exemplary embodiment. The terminal device 2 specifies document data stored in the document server 5 in accordance with, for example, a user operation or the like, and also specifies the image forming device 1 by device ID. Then, the terminal device 2 instructs the document server 5 to form the image corresponding to the specified document data on a recording medium using the specified image forming device 1 (step S201). Therefore, the communication unit 23 and the controller 21 of the terminal device 2 are examples of an instruction unit that sends an instruction to the server device to provide the information processing device with a service. The communication unit 53 and the controller 51 of the document server 5 that receives the instruction are examples of a receiving unit that receives an instruction from the terminal device to provide the information processing device with a predetermined service.

When the image forming device 1 is specified by device ID, the controller 51 of the document server 5 refers to the device list 523 in the memory 52, and confirms that the image forming device 1 is associated with the user of the terminal device 2. Then, the controller 51 sends a HIP request to the image forming device 1 (step S202). That is, the controller 51 is an example of a first request unit that presents a test to the information processing device to authenticate whether or not the information processing device is being operated by a human and that requests the information processing device to make a response to the test. Specifically, the document server 5 may transmit a CAPTCHA-based test to the image forming device 1. The image forming device 1 receives the test and a request for making a response to the test. That is, the communication unit 13 and the controller 11 of the image forming device 1 are examples of a receiving unit that receives, via the communication unit from the server device that has received an instruction from the terminal device to provide a predetermined service, a test for authenticating whether or not the information processing device is being operated by a human and a request for making a response to the test. The operation unit 14, which is included in the image forming device 1, may be used, for example, when the mode of the image forming device 1 is changed to a maintenance mode. Here, the image forming device 1 is in a mode in which the image forming device 1 is remotely operated by the document server 5 or the terminal device 2, and is not being operated by a human. Therefore, the controller 11 of the image forming device 1 is not able to solve the CAPTCHA-based test. Thus, for example, the controller 11 returns a HIP having predetermined content to make a response, or sets the state of the image forming device 1 to a standby state in which no response is made (step S203). Here, the operation of making a response to a HIP request may also include the operation of setting the state of the image forming device 1 to a standby state.

The document server 5 authenticates the HIP transmitted from the image forming device 1, or determines that no response is made by the image forming device 1 after a preset time has elapsed (step S204), and determines that the party accessing the document server 5 using the image forming device 1 is not a human. Then, the document server 5 transmits a HIP rejection notification to the image forming device 1 (step S205). That is, the communication unit 53 and the controller 51 of the document server 5 are examples of a notification unit that notifies the information processing device of rejection of a proof that a device that has made a response is being operated by a human, on the basis of the response made by the information processing device in response to the request from the first request unit, or on the basis of no response within a predetermined period. Upon detection of a HIP rejection notification sent from the document server 5 (step S206), the controller 11 of the image forming device 1 requests the terminal device 2 to transmit a HIP, which is to be authenticated by the document server 5, by proxy (step S207). That is, the controller 11 is an example of a request unit that, upon detection of the notification sent from the notification unit, requests the terminal device to make a proxy response to the test for authenticating whether or not the information processing device is being operated by a human. In other words, the controller 11 is an example of a request unit that, upon being notified by the server device that a proof that a device that has made a response is being operated by a human is to be rejected, requests the terminal device to make a proxy response to the test. The request for making a proxy response to the test is hereinafter referred to as a "proxy-HIP request".

The relay device 3 guarantees that a proxy-HIP request would not be correctly accepted if the proxy-HIP request is not made between devices connected via a local area network in the image forming system 9. That is, a proxy-HIP request includes content that does not reach a device outside a local area network. For example, the filter information 322 in the relay device 3 may include a rule that a packet including a proxy-HIP request be discarded if the IP address of the destination described in the packet is not a local IP address. That is, the relay device 3 is an example of a relay device that does not relay communication having content common to the request sent from the request unit, except when the communication is established between two devices connected to the first communication network.

Upon receipt of the proxy-HIP request, the terminal device 2 notifies the document server 5 that the terminal device 2 transmits a HIP on behalf of the image forming device 1 (step S208). In accordance with the notification, the document server 5 requests the terminal device 2 to transmit a HIP (step S209). In the request, the content of the test may be common to that in step S202, or may be new. The terminal device 2 receives the operation performed by the user using the operation unit 24, and transmits a HIP based on the operation to the document server 5 (step S210).

That is, the communication unit 23 and the controller 21 of the terminal device 2 are examples of a response unit that makes a response to the test on behalf of the information processing device in accordance with the operation of the user if the information processing device is requested by the first request unit to make a response to the test. In the first exemplary embodiment, the response unit makes a proxy response to a test upon receipt of a request from the request unit to make a response on behalf of the information processing device.

The document server 5 authenticates the proxy HIP transmitted from the terminal device 2 (step S211), and notifies the terminal device 2 that the HIP is to be accepted (step S212). The document server 5 also requests the image forming device 1 to send user certificate data (step S213). In response to the request, the image forming device 1 transmits the user certificate data 121 stored in the memory 12 to the document server 5 (step S214).

The document server 5 matches the user certificate data 121 received from the image forming device 1 with the content stored in the user certificate DB 521 to perform user identity authentication (step S215). Upon acceptance of the user certificate data 121 received from the image forming device 1, the document server 5 generates, based on document data specified by the terminal device 2, image data representing an image corresponding to the document data (step S216), and transmits the generated image data to the image forming device 1 (step S217). That is, the controller 51 of the document server 5 is an example of a providing unit that provides the information processing device with a service in accordance with the instruction received by the receiving unit if a device that has made a response to the first request unit is being operated by a human.

The term "device that has made a response to the first request unit", as used here, also includes a device that has made a response on behalf of a device requested by the first request unit. That is, in the first exemplary embodiment, the controller 51 of the document server 5 is an example of a providing unit that provides the information processing device with a service if the terminal device that has sent a response to the first request unit (request unit) on behalf of the information processing device is being operated by a human. In the first exemplary embodiment, the providing unit provides the information processing device with image data representing the image according to the instruction.

The image forming device 1 acquires the image data transmitted from the document server 5. That is, the communication unit 13 and the controller 11 of the image forming device 1 are examples of a second acquisition unit that acquires image data representing the image according to the instruction from the server device if the server device accepts a proof that a device that has made a response is being operated by a human, on the basis of a response transmitted from the terminal device by proxy in response to the request from the request unit. The image data generated in step S216 may be stored in the image data storage area 525 of the memory 52 before being transmitted to the image forming device 1 in step S217.

Accordingly, the transmission of a HIP, for which a request has been sent from the document server 5 to the image forming device 1, is performed by the terminal device 2, and the image forming device 1 forms the image corresponding to the document data specified by the user via the terminal device 2 on a recording medium. That is, the image forming unit 15 of the image forming device 1 is an example of an image forming unit that forms an image on a recording medium on the basis of the image data acquired by the second acquisition unit. Since it is guaranteed that the proxy-HIP request described above has been made between at least devices connected to a local area network, the image forming device 1 and the terminal device 2 are estimated to be located comparatively close to each other. Consequently, the document server 5 determines that the image forming device 1 is under control of the user who is guaranteed to be operating the terminal device 2 and to be a human, and permits the image forming device 1 to form the image corresponding to the document data. Therefore, the image forming device 1 may not necessarily have a configuration that supports the CAPTCHA authentication method, such as a liquid crystal monitor.

Furthermore, a user may not necessarily move from the place where the terminal device 2 is installed to the place where the image forming device 1 is installed each time the user sends an instruction to form an image. Additionally, it is guaranteed that the image forming device 1 to which the document server 5 is to transmit image data is located in the local area network common to the terminal device 2. Thus, the document server 5 may provide data for only devices that are trustworthy as well as the terminal device 2.

2. Second Exemplary Embodiment

Next, a second exemplary embodiment of the present invention will be described. Since the second exemplary embodiment includes multiple components common to the first exemplary embodiment, components different from those in the first exemplary embodiment are assigned new reference numerals and the description of the common components will be omitted.

2-1. Configuration

Figure 13:
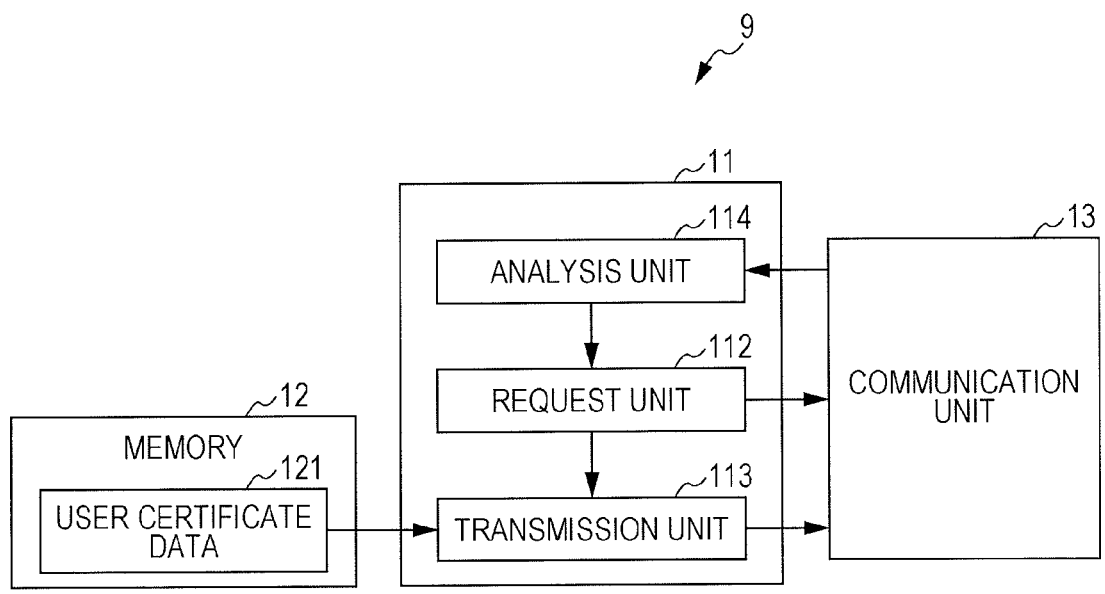
FIG. 13 illustrates the functional configuration of an image forming device according to a second exemplary embodiment.

FIG. 13 illustrates the functional configuration of an image forming device 1 included in an image forming system 9 according to the second exemplary embodiment. While the controller 11 of the image forming device 1 according to the first exemplary embodiment functions as the detection unit 111, a controller 11 of the image forming device 1 functions as an analysis unit 114 in place of the detection unit 111. The analysis unit 114 is a unit that analyzes a request delivered from the document server 5 from the communication received by the communication unit 13 and that determines whether or not the request includes a "HIP request".

2-2. Operations

Figure 14:
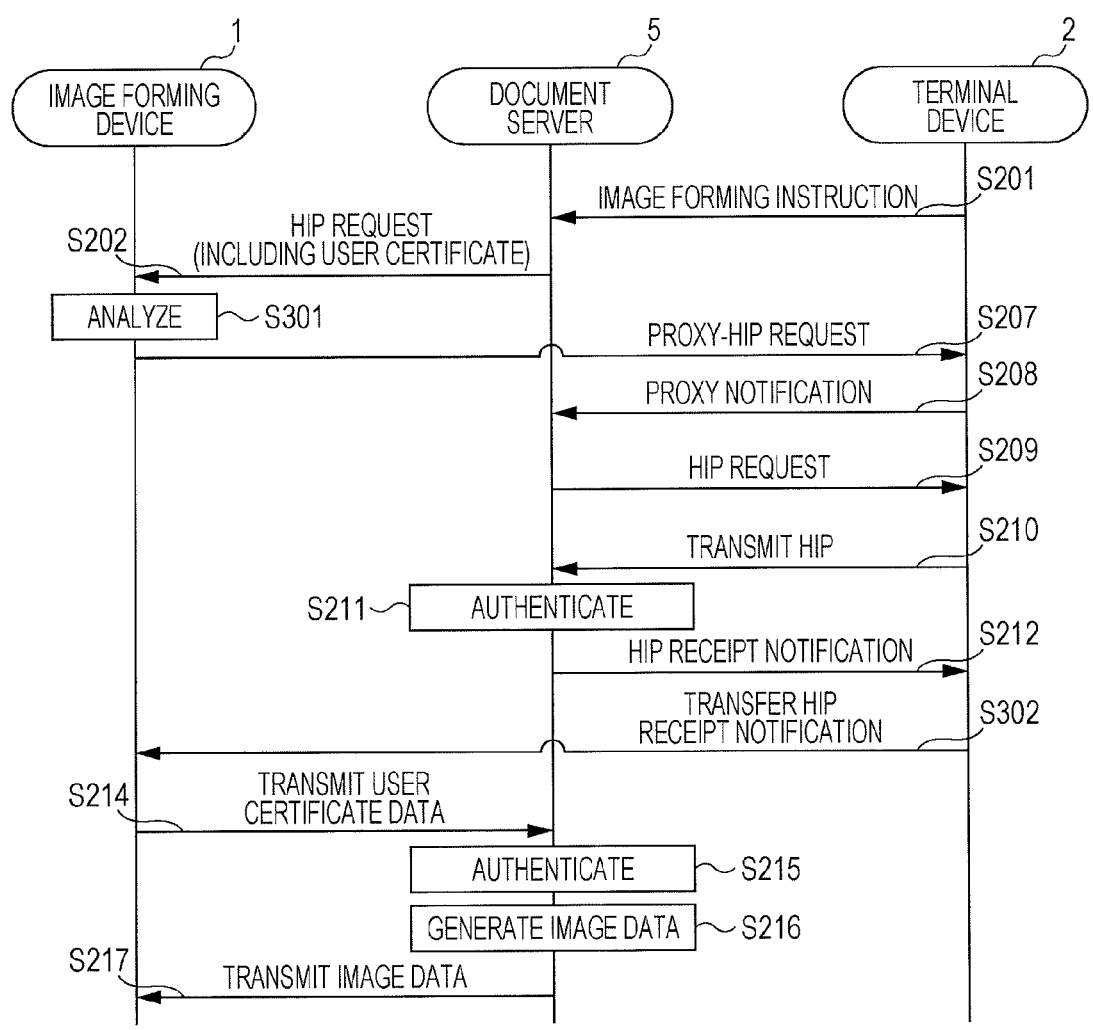
FIG. 14 is a flow diagram illustrating an operation of forming an image according to the second exemplary embodiment.

FIG. 14 is a flow diagram illustrating an operation in which a document server 5 causes the image forming device 1 to form an image corresponding to document data specified by a terminal device 2 according to the second exemplary embodiment. The operation different from the operation performed in the image forming system 9 according to the first exemplary embodiment illustrated in FIG. 12 will be described hereinafter.

When the document server 5 sends a request to the image forming device 1 to transmit a user certificate and a HIP (step S202), the image forming device 1 that has received the request analyzes the request without making a response to the request (step S301). As a result of the analysis, if it is determined that the request includes a HIP request, the image forming device 1 transmits a proxy-HIP request to the terminal device 2 (step S207). That is, the controller 11 of the image forming device 1 is an example of a request unit that requests the terminal device to make a response to the test by proxy if a test for authenticating whether or not the image forming device 1 is being operated by a human is presented by the first request unit. In other words, the controller 11 is an example of a request unit that requests the terminal device to make a response to the test by proxy if the test is presented by the server device. In this case, unlike the first exemplary embodiment, the document server 5 has not obtained a response to the HIP request sent in step S202, and is therefore waiting for a response from the image forming device 1.

If the HIP sent from the terminal device 2 by proxy is authenticated by the document server 5 through the processing of steps S208 to S212, the terminal device 2 transfers a HIP acceptance notification received from the document server 5 to the image forming device 1 (step S302). Upon receipt of the HIP acceptance notification transferred from the terminal device 2, in response to a trigger indicating that the HIP acceptance notification has been received, the image forming device 1 transmits the user certificate data 121 to the document server 5 (step S214). Therefore, the document server 5 exits the state of waiting for a response from the image forming device 1, authenticates the received user certificate data 121, and supplies the image data to the image forming device 1 (step S215 to S217).

Accordingly, the image forming device 1 analyzes the request received from the document server 5 before making a response to the request. If it is determined that the request includes a HIP request, the image forming device 1 requests the terminal device 2 to transmit a HIP by proxy, thus preventing a response that will be predicted to be rejected from being created. Additionally, the document server 5 is not required to authenticate a HIP that will be predicted to be rejected, or is not required to deliver a HIP rejection notification to the image forming device 1. Thus, no extra communication may occur unlike the case where the above configuration is not used.

3. Third Exemplary Embodiment

Next, a third exemplary embodiment of the present invention will be described. Since the third exemplary embodiment includes multiple components common to the first exemplary embodiment, components different from those in the first exemplary embodiment are assigned new reference numerals and the description of the common components will be omitted.

3-1. Configuration

Figure 15:
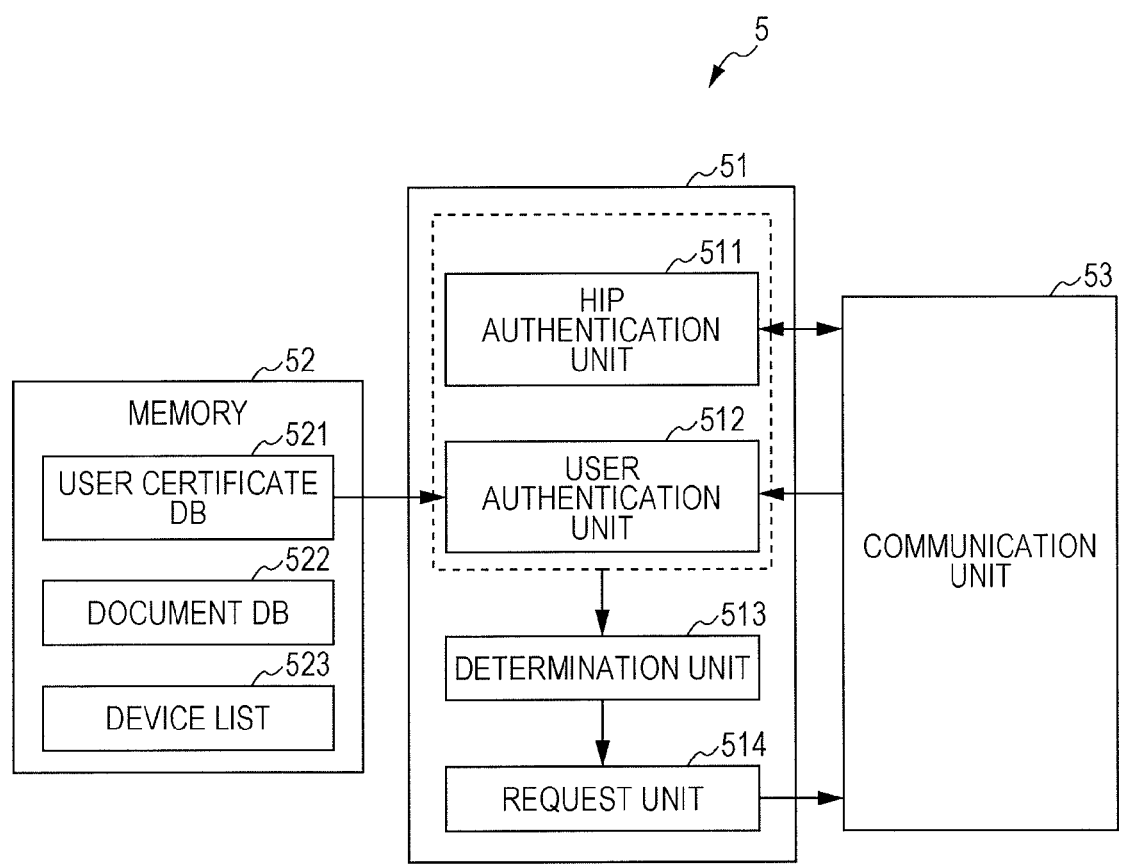
FIG. 15 illustrates the functional configuration of a document server according to a third exemplary embodiment.

FIG. 15 illustrates the functional configuration of a document server 5 included in an image forming system 9 according to the third exemplary embodiment. In the first and second exemplary embodiments, the request unit that transmits a proxy-HIP request to the terminal device 2 is implemented by the controller 11 of the image forming device 1. In the third exemplary embodiment, in contrast, the above request unit may be implemented by the controller 51 of the document server 5. Here, it is guaranteed that a proxy-HIP request forwarded to the terminal device 2 when the controller 51 functions as the request unit is not filtered by a relay device 3 according to the third exemplary embodiment. That is, in the image forming system 9 according to the third exemplary embodiment, the relay device 3 guarantees that a proxy-HIP request would be correctly accepted even if the proxy-HIP request is not made between devices connected to a local area network.

A controller 51 of the document server 5 functions as a HIP authentication unit 511, a user authentication unit 512, a determination unit 513, and a request unit 514.

The HIP authentication unit 511 is a unit that determines whether or not the operator of the device at the destination to which data is transmitted is a human, based on, for example, the CAPTCHA-based test described above. Specifically, the HIP authentication unit 511 transmits data representing a test image in which a randomly generated and distorted character string is drawn to the image forming device 1 or the terminal device 2 via the communication unit 53, and matches a character string obtained in response to the data with the original character string. If they match, it is determined that the operator is a human. If they do not match, it is determined that the operator is not a human. Further, as described above, the HIP authentication unit 511 also determines that the operator is not a human if no response is returned over a preset period of time.

The user authentication unit 512 is a unit that matches the user certificate data received via the communication unit 53 with the content stored in the user certificate DB 521 to perform user identity authentication. In the user certificate DB 521, a password stored in association with a user ID is managed so that anyone other than the user identified by the user ID may not know. Thus, it is guaranteed that the person who transmits user certificate data in which the password and the user ID are associated with each other is the above user or at least a machine authorized by the user.

The determination unit 513 is a unit that determines a process to be executed in accordance with the combination of authentication results obtained by the HIP authentication unit 511 and the user authentication unit 512. Specifically, if the HIP authentication unit 511 rejects a HIP transmitted from the image forming device 1 and the user authentication unit 512 accepts a user certificate transmitted from the image forming device 1, the determination unit 513 causes the request unit 514, which will be described below, to request the terminal device 2 to send a HIP by proxy. The request unit 514 is a unit that requests the terminal device 2 via the communication unit 53 and the relay device 3 so that the terminal device 2 may send a HIP, which is to be authenticated by the document server 5, by proxy.

3-2. Operations

Figure 16:
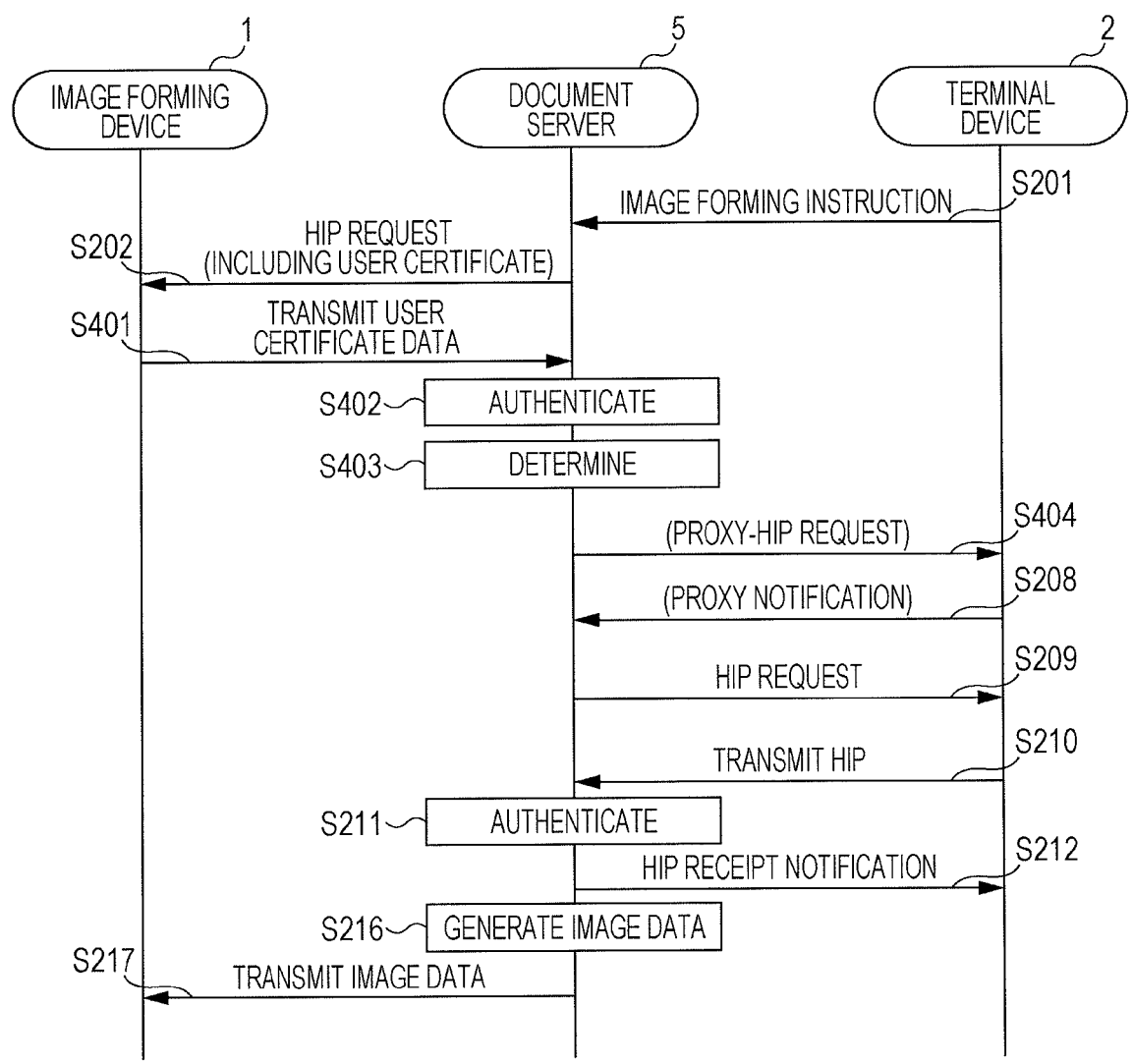
FIG. 16 is a flow diagram illustrating an operation of forming an image according to the third exemplary embodiment.

FIG. 16 is a flow diagram illustrating an operation in which the document server 5 causes the image forming device 1 to form an image corresponding to document data specified by the terminal device 2 according to the third exemplary embodiment. The operation different from the operation performed in the image forming system 9 according to the first exemplary embodiment illustrated in FIG. 12 will be described hereinafter.

When the document server 5 sends a request to the image forming device 1 to transmit a user certificate and a HIP (step S202), the image forming device 1 that has received the request transmits only the user certificate data 121 in accordance with the request (step S401). The document server 5 receives a response from the image forming device 1, and performs HIP authentication and user certificate authentication (step S402). Then, the document server 5 performs determination based on the authentication results (step S403). If it is determined that the authentication results indicate that the HIP is to be rejected and the user certificate is to be accepted, the document server 5 transmits a proxy-HIP request to the terminal device 2 (step S404). Here, the document server 5 will reject the HIP for the image forming device 1 for the reason that no HIP is transmitted from the image forming device 1 for a predetermined period. It is noted that, instead of transmitting only the user certificate data 121, the image forming device 1 may transmit a predetermined (for example, dummy) HIP together with the user certificate data 121. In this case, the document server 5 rejects the HIP transmitted from the image forming device 1 in the above authentication because the HIP is not authentic. That is, the communication unit 53 and the controller 51 of the document server 5 are examples of a request unit that requests the terminal device to make a response to the test by proxy if a proof that a device that has made a response is being operated by a human is to be rejected on the basis of the response made by the information processing device in response to the request from the first request unit or on the basis of no response within a predetermined time.

When the HIP sent from the terminal device 2 by proxy is authenticated by the document server 5 through the processing of steps S208 to S212, the document server 5 supplies image data to the image forming device 1 (step S216, S217).

Accordingly, if the user certificate for the image forming device 1 is to be accepted even though the HIP is to be rejected, the document server 5 requests the terminal device 2 to transmit a HIP that is not accepted to cause the terminal device 2 to send a HIP by proxy, thereby determining whether or not the image forming device 1 is to be permitted to form an image. In the third exemplary embodiment, it is not guaranteed that a proxy-HIP request has been made between devices connected to a local area network. Therefore, it is difficult to determine whether or not the image forming device 1 and the terminal device 2 are located near. However, a proxy-HIP request is sent from the document server 5 to the terminal device 2 and thereafter it is verified that the terminal device 2 is being operated by a human user, thus allowing at least the user operating the terminal device 2 to be notified that the document server 5 would reject the HIP for the image forming device 1. Therefore, the image forming device 1 may be estimated to be under control of the user operating the terminal device 2. Further, the document server 5 is not required to send a HIP rejection notification to the image forming device 1. Thus, no extra communication may occur unlike the case where the above configuration is not used.

It is noted that the document server 5 may not necessarily be required to send a proxy-HIP request to the terminal device 2 in step S404 or the terminal device 2 may not necessarily be required to send a proxy notification to the document server 5. That is, the document server 5 may directly send a HIP request to the terminal device 2.

4. Fourth Exemplary Embodiment

Next, a fourth exemplary embodiment of the present invention will be described. Since the fourth exemplary embodiment includes multiple components common to the third exemplary embodiment, components different from those in the third exemplary embodiment are assigned new reference numerals and the description of the common components will be omitted.

4-1. Configuration

Figure 17:
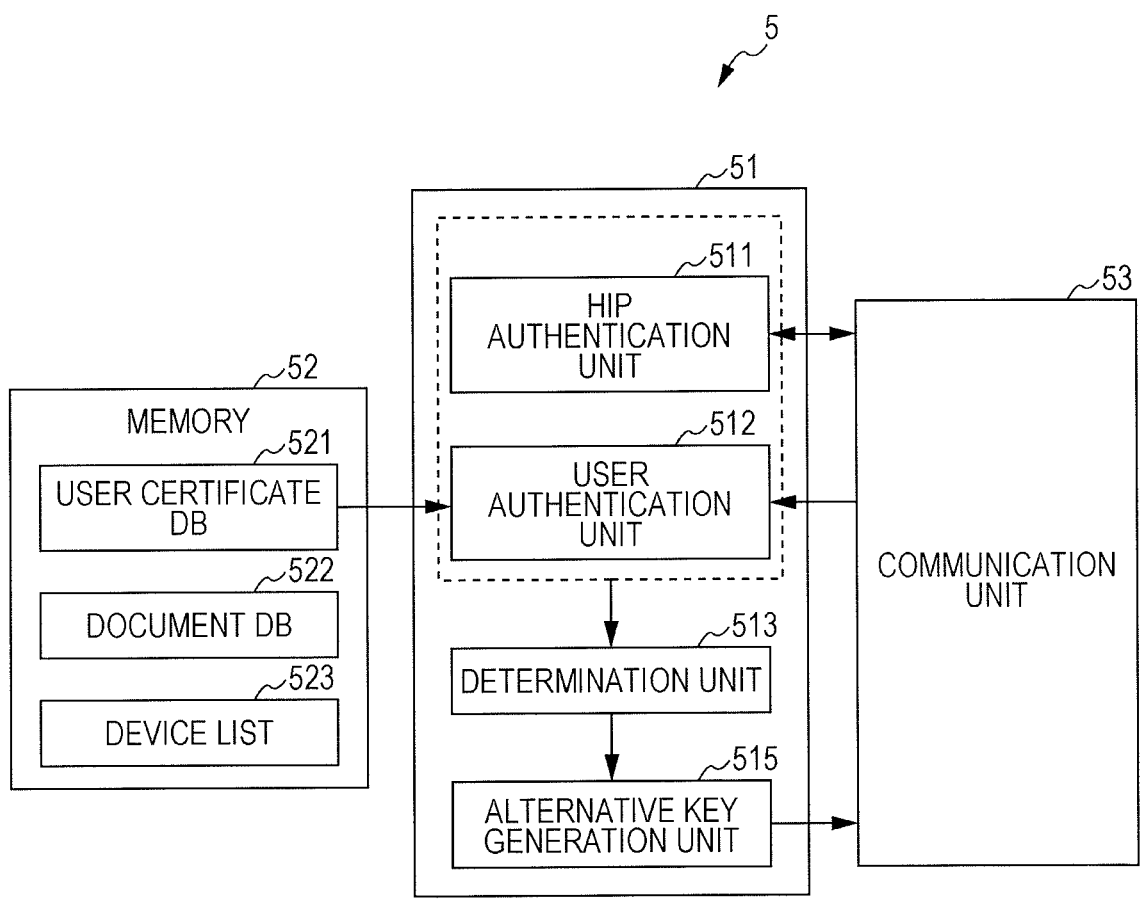
FIG. 17 illustrates the functional configuration of a document server according to a fourth exemplary embodiment.

FIG. 17 illustrates the functional configuration of a document server 5 included in an image forming system 9 according to the fourth exemplary embodiment. In the third exemplary embodiment, the controller 51 of the document server 5 functions as a request unit that sends a proxy-HIP request to the terminal device 2. In the fourth exemplary embodiment, in contrast, the controller 51 functions as, in place of the request unit 514, an alternative key generation unit 515 that generates and transmits an alternative key and that instructs the delivery of the alternative key. The process for distributing an alternative key to a specified device is here referred to as "distribution of an alternative key".

The determination unit 513 is a unit that determines a process to be executed in accordance with the combination of authentication results obtained by the HIP authentication unit 511 and the user authentication unit 512. Specifically, if the HIP authentication unit 511 rejects the HIP for the image forming device 1 and the user authentication unit 512 accepts the user certificate for the image forming device 1, the determination unit 513 causes the alternative key generation unit 515 described above to instruct the terminal device 2 to distribute an alternative key.

4-2. Operations

Figure 18:
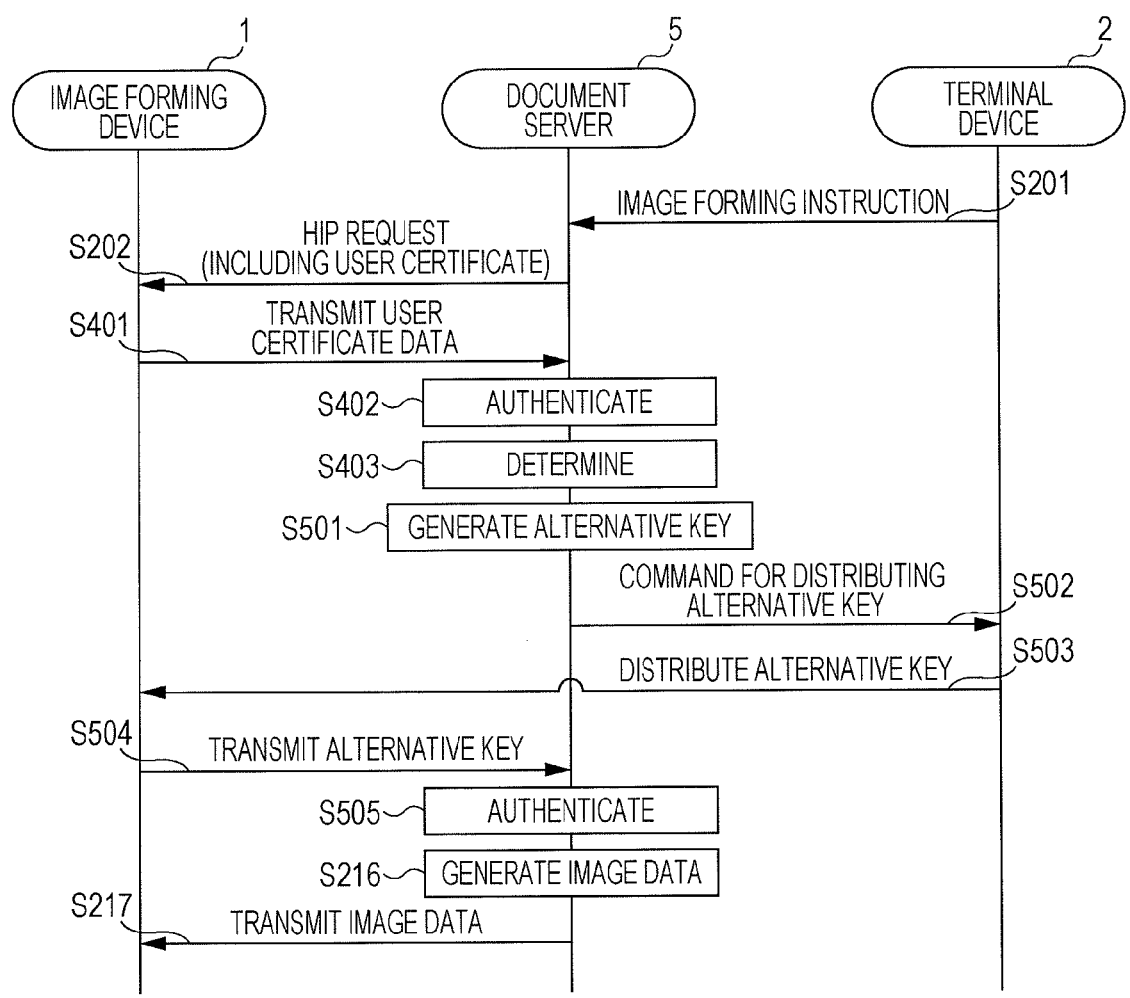
FIG. 18 is a flow diagram illustrating an operation of forming an image according to the fourth exemplary embodiment.

FIG. 18 is a flow diagram illustrating an operation in which the document server 5 causes the image forming device 1 to form an image corresponding to document data specified by the terminal device 2 according to the fourth exemplary embodiment. The operation different from the operation performed in the image forming system 9 according to the third exemplary embodiment illustrated in FIG. 12 will be described hereinafter.

The document server 5 performs determination based on the authentication results of the HIP and user certificate for the image forming device 1 (step S403). If it is determined that the authentication results indicate that the HIP is to be rejected and the user certificate is to be accepted, the document server 5 generates a single-use alternative key by, for example, generating a pseudo-random number using, as a seed, time information indicating the current time obtained from a timer and encrypting the pseudo-random number using the public key owned by the document server 5 (step S501). The alternative key may serve as an alternative to a HIP. Then, the document server 5 transmits the alternative key to the terminal device 2 via an encrypted communication path set up between the document server 5 and the terminal device 2, and also commands the terminal device 2 to distribute the alternative key to the image forming device 1 specified by device ID in step S201 (step S502). That is, the communication unit 53 and the controller 51 of the document server 5 are examples of a first command unit that, if a proof that a device that has made a response is being operated by a human is to be rejected on the basis of a response made by the information processing device in response to a request from the first request unit or on the basis of no response within a predetermined period, transmits an alternative key serving as an alternative to the proof to the terminal device and commands the terminal device to distribute the alternative key to the information processing device.

Upon receipt of the instruction, the terminal device 2 distributes the alternative key to the image forming device 1 via the relay device 3 (step S503). That is, the communication unit 23 and the controller 21 of the terminal device 2 are examples of a response unit that distributes the alternative key to the information processing device, instead of making a response to the test, in accordance with a command given by the first command unit. The image forming device 1 transmits the distributed alternative key to the document server 5 (step S504). The document server 5 decodes the alternative key transmitted from the image forming device 1 using the private key owned by the document server 5, and compares the decoded alternative key with the original pseudo-random number to authenticate whether or not the alternative key is the same as the alternative key transmitted from the document server 5 in accordance with the command given to the terminal device 2 (step S505). As a result of authentication, if it is verified that the alternative key transmitted from the image forming device 1 is the same as the alternative key transmitted from the document server 5 in accordance with the command given to the terminal device 2, the document server 5 supplies the image data to the image forming device 1 (step S216, S217). That is, the communication unit 53 and the controller 51 of the document server 5 are examples of a providing unit that provides the information processing device with a service if the alternative key transmitted to the terminal device using the first command unit is received from the information processing device.

Accordingly, if the user certificate for the image forming device 1 is to be accepted even though the HIP is to be rejected, the document server 5 generates an alternative key and distributes the alternative key to the terminal device 2. The alternative key is re-distributed to the image forming device 1 located in the local area network, and the document server 5 receives the alternative key from the image forming device 1. Therefore, the document server 5 determines that the image forming device 1 is under control of the user operating the terminal device 2, and permits the image forming device 1 to form the image corresponding to the document data.

In the fourth exemplary embodiment described above, if it is determined that the HIP is to be rejected and the user certificate is to be accepted, the document server 5 transmits an alternative key to the terminal device 2, and commands the terminal device 2 to distribute the alternative key to the image forming device 1. In addition to the above configuration, as in the first exemplary embodiment, the document server 5 may transmit a HIP rejection notification to the image forming device 1. In this case, the controller 11 of the image forming device 1 may detect the notification, wait for the alternative key to be distributed from the document server 5 via the terminal device 2, instead of requesting the terminal device 2 to make a response to the test by proxy, and transmit the distributed alternative key to the document server 5. That is, the controller 11 of the image forming device 1 is an example of a request unit that, after the receiving unit receives a test for authenticating whether or not the information processing device (image forming device 1) is being operated by a human or receives a request for making a response to the test, if the server device rejects a proof that a device that is to make a response is being operated by a human on the basis of a response made by the information processing device (image forming device 1), or on the basis of no response within a predetermined period, acquires an alternative key serving as an alternative to the proof from the server device via the terminal device, instead of sending a request for making a response to the test by proxy, and transmits the acquired alternative key to the server device.

5. Fifth Exemplary Embodiment

Next, a fifth exemplary embodiment of the present invention will be described. Since the fifth exemplary embodiment includes multiple components common to the fourth exemplary embodiment, components different from those in the fourth exemplary embodiment are assigned new reference numerals and the description of the common components will be omitted.

5-1. Configuration

Figure 19:
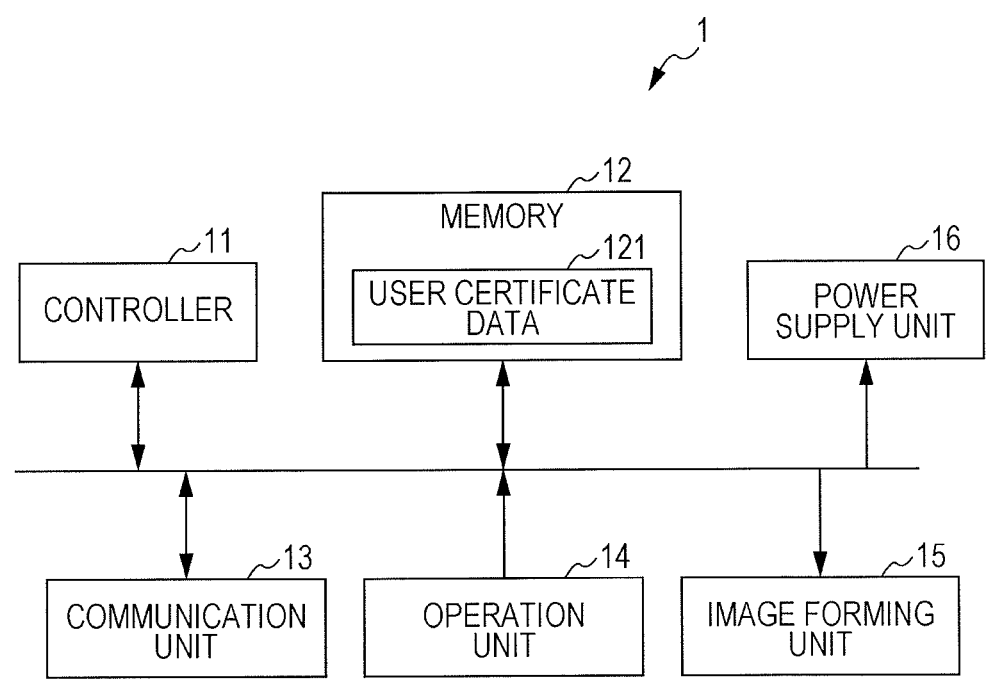
FIG. 19 illustrates the configuration of an image forming device according to a fifth exemplary embodiment.

FIG. 19 illustrates the functional configuration of an image forming device 1 according to the fifth exemplary embodiment. A power supply unit 16 illustrated in FIG. 19 is a device that supplies electric power to the individual components of the image forming device 1. While the image forming device 1 according to the first to fourth exemplary embodiments also includes a power supply unit not illustrated in the respective figures, the power supply unit 16 of the image forming device 1 according to the fifth exemplary embodiment is configured to switch under control of the controller 11 between a non-power saving mode and a power saving mode. In the non-power saving mode, electric power is supplied to the controller 11, the memory 12, the communication unit 13, the operation unit 14, and the image forming unit 15. In the power saving mode, electric power is supplied to only the controller 11.

Figure 20:
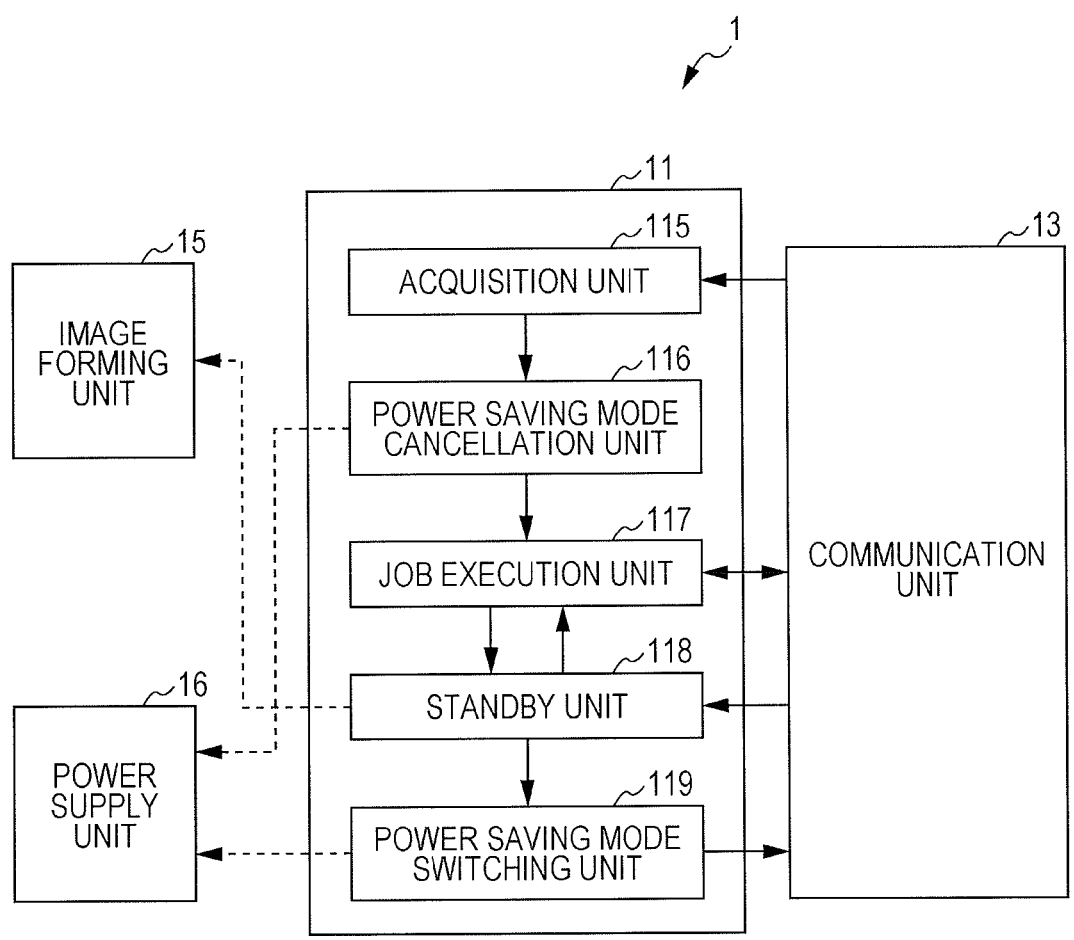
FIG. 20 illustrates the functional configuration of the image forming device according to the fifth exemplary embodiment.

FIG. 20 illustrates the functional configuration of the image forming device 1 according to the fifth exemplary embodiment. As illustrated in FIG. 20, the controller 11 of the image forming device 1 functions as an acquisition unit 115, a power saving mode cancellation unit 116, a job execution unit 117, a standby unit 118, and a power saving mode switching unit 119. The acquisition unit 115 is a unit that is executed by the controller 11 in the power saving mode and that stands by until a command for canceling the power saving mode is given by the document server 5 via the communication unit 13. The power saving mode cancellation unit 116 is a unit that commands the power supply unit 16 to cancel the power saving mode when the acquisition unit 115 acquires a command for canceling the power saving mode. In response to the command for canceling the power saving mode, the power supply unit 16 sets the non-power saving mode, and supplies electric power to the individual components of the image forming device 1.

When the image forming device 1 enters the non-power saving mode, the job execution unit 117 requests the document server 5 via the communication unit 13 to set up a channel. After a channel is set up, the job execution unit 117 acquires image data, in accordance with a progress notification sent from the document server 5, until there is no image data left in the document server 5 (that is, until no job remains). The image forming unit 15 forms an image based on the image data acquired by the job execution unit 117. The standby unit 118 is a unit that measures the time elapsed after the job execution unit 117 determines that no job remains, and that determines whether or not the elapsed time exceeds a threshold. The power saving mode switching unit 119 is a unit that, if the standby unit 118 determines that the elapsed time exceeds the threshold, commands the power supply unit 16 to set the power saving mode and that requests the document server 5 via the communication unit 13 to close the channel.

Figure 21:
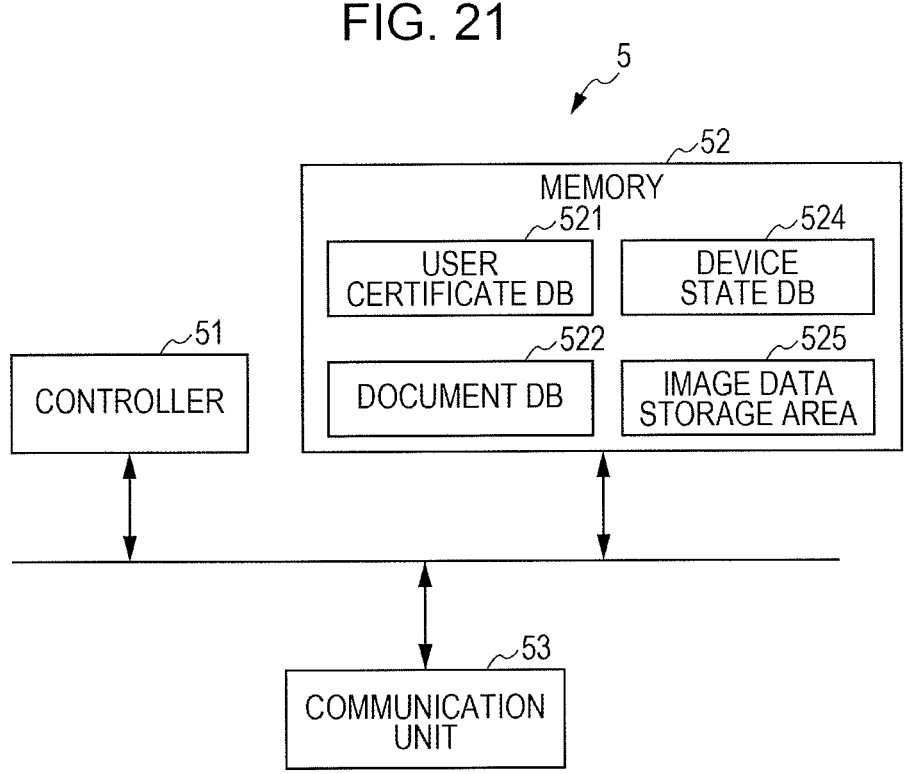
FIG. 21 illustrates the configuration of a document server according to the fifth exemplary embodiment.
Figure 22:
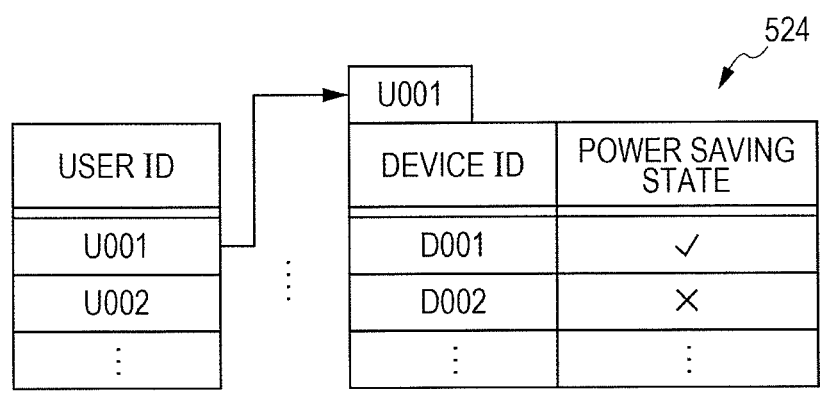
FIG. 22 illustrates an example of a device state DB according to the fifth exemplary embodiment.

FIG. 21 illustrates the functional configuration of the document server 5 according to the fifth exemplary embodiment. The difference from the document server 5 illustrated in FIG. 6 is that the memory 52 includes a device state DB 524 in place of the device list 523. FIG. 22 illustrates an example of the device state DB 524 according to the fifth exemplary embodiment. In the device state DB 524 illustrated in FIG. 22, device IDs "D001", "D002", etc. are associated with user ID "U001", and, for each device ID, whether or not the device identified by the device ID is in the power saving state is also described. A device for which a tick is placed in the "power saving state" column is in the power saving mode, and a device for which a cross is placed in the "power saving state" column is not in the power saving mode.

Figure 23:
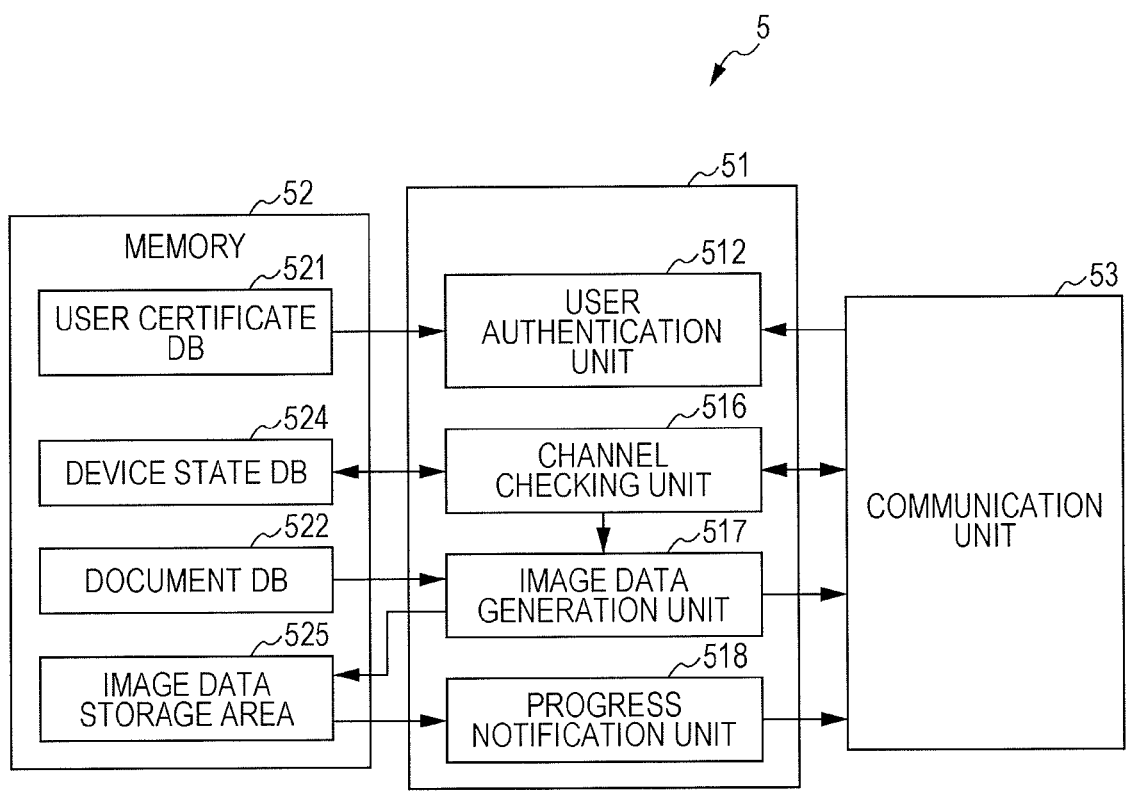
FIG. 23 illustrates the functional configuration of the document server according to the fifth exemplary embodiment.

FIG. 23 illustrates the functional configuration of the document server 5 according to the fifth exemplary embodiment.

A user authentication unit 512 is a unit that performs user identity authentication by matching user certificate data received via the communication unit 53 with the content stored in a user certificate DB 521. A channel checking unit 516 is a unit that monitors the communication state with the image forming device 1 and that updates the content stored in the device state DB 524. Upon receipt of a channel close request from the image forming device 1 via the communication unit 53, the channel checking unit 516 closes the channel set up between the document server 5 and the image forming device 1, and accesses the device state DB 524 in the memory 52 to change the mark placed in the "power saving state" column for the device ID of the image forming device 1 to a tick (or set the mode of the image forming device 1 to the power saving mode). Upon receipt of an image forming instruction from the terminal device 2 via the communication unit 53, on the other hand, the channel checking unit 516 refers to the device state DB 524, and checks the mark in the "power saving state" column for the device ID included in the image forming instruction. In this case, if a tick is placed in the "power saving state" column (i.e., the power saving mode is set), the channel checking unit 516 sets up a channel between the document server 5 and the image forming device 1 identified by the device ID via the communication unit 53.

After receipt of an image forming instruction from the terminal device 2, an image data generation unit 517 searches the document DB 522 for the document data specified by the image forming instruction, and generates image data corresponding to the document data. Here, if a tick is placed in the "power saving state" column for the image forming device 1, which is indicated in the device state DB 524 (i.e., if the image forming device 1 is in the power saving mode), the image data generation unit 517 stores the generated image data as a queue in the image data storage area 525 of the memory 52. That is, the image data stored in the image data storage area 525 is stored with a first-in-first-out (FIFO) list structure. If a cross is placed in the "power saving state" column (i.e., if the image forming device 1 is in the non-power saving mode), the controller 51 of the document server 5 reads older image data, transmits the read image data to the image forming device 1, and deletes the image data after the completion of transmission. A progress notification unit 518 refers to the image data storage area 525, and notifies the image forming device 1 of the number of pieces of image data that has not been transmitted.

5-2. Operations

Next, the operation performed in the image forming system 9 according to the fifth exemplary embodiment of the present invention will be described.

5-2-1. Power Saving Mode Transition Operation

Figure 24:
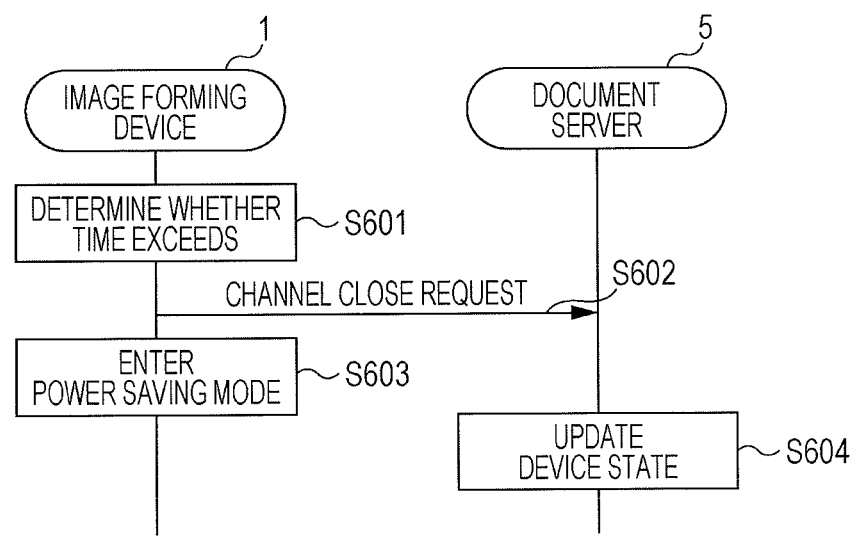
FIG. 24 is a flow diagram illustrating an operation in which the image forming device enters an power saving mode according to the fifth exemplary embodiment.

FIG. 24 is a flow diagram illustrating an operation in which the image forming device 1 sends a channel close request to the document server 5, and enters the power saving mode according to the fifth exemplary embodiment. First, an encrypted communication channel is established between the image forming device 1 and the document server 5. The controller 11 of the image forming device 1 determines whether or not the time elapsed after the last image forming instruction is received from the document server 5 exceeds a predetermined threshold (step S601). If it is determined that the elapsed time exceeds the threshold, the channel between the image forming device 1 and the document server 5 is closed (step S602), and the image forming device 1 enters the power saving mode (step S603). That is, the controller 11 of the image forming device 1 is an example of a transition unit that closes the communication path established with the server device and that causes a transition to the power saving mode. When the channel is closed, the document server 5 updates the device state DB 524 in the memory 52 (step S604).

5-2-2. Power Saving Mode Cancellation Operation

Figure 25:
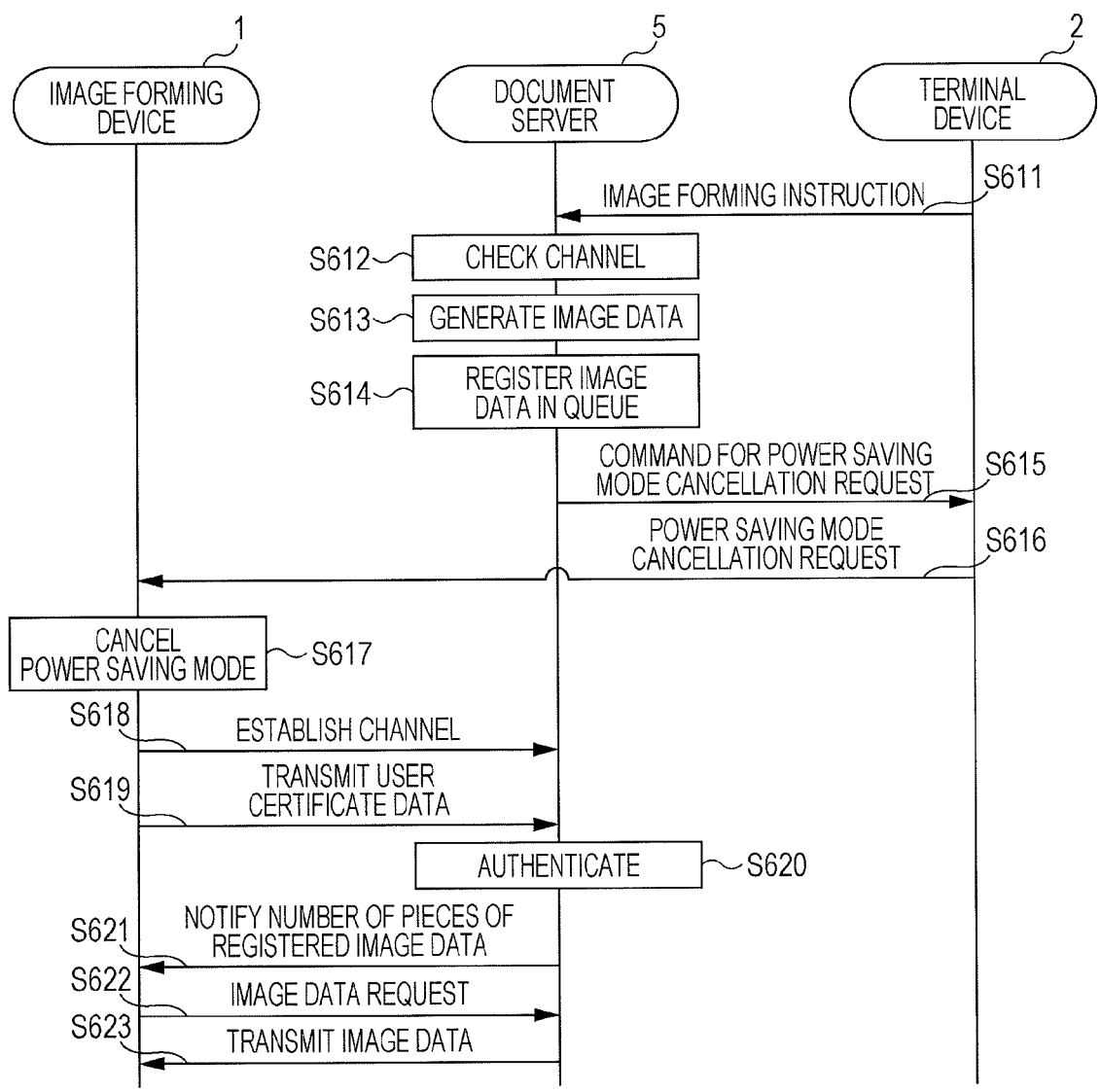
FIG. 25 is a flow diagram illustrating an operation in which the image forming device cancels the power saving mode and forms an image according to the fifth exemplary embodiment.

FIG. 25 is a flow diagram illustrating an operation in which the image forming device 1 cancels the power saving mode and forms an image according to the fifth exemplary embodiment. The terminal device 2 specifies document data stored in the document server 5 in accordance with, for example, a user operation or the like, and also specifies the image forming device 1 by device ID. Then, the terminal device 2 instructs the document server 5 to cause the specified image forming device 1 to form the image corresponding to the specified document data on a recording medium (step S611).

When the image forming device 1 is specified by device ID, the controller 51 of the document server 5 refers to the device state DB 524 in the memory 52, and confirms that the image forming device 1 is associated with the user of the terminal device 2. The controller 51 further checks the mark placed in the "power saving state" column for the device ID included in the image forming instruction (step S612). Since a tick is placed in the "power saving state" column (i.e., the power saving mode has been set), the document server 5 generates image data corresponding to the specified document data (step S613), and stores the generated image data as a queue in the image data storage area 525 of the memory 52 (step S614).

Then, the document server 5 commands the terminal device 2 to request the image forming device 1 to cancel the power saving state (step S615). That is, the controller 51 of the document server 5 is an example of a second command unit that commands the terminal device to request the information processing device to cancel a power saving mode for reducing the power consumption if a communication path established with the information processing device is closed when the receiving unit receives the instruction. Here, the relay device 3 performs filtering. That is, the relay device 3 permits a device in the LAN 4 to request a device in the LAN 4 to set up or close a channel, and further permits a device in the LAN 4 to request a device in the cloud 6 to set up or close a channel. Further, the relay device 3 prohibits a device in the cloud 6 from requesting a device in the LAN 4 to set up or close a channel. That is, the relay device 3 is an example of a relay device that does not relay communication if setting up of a communication path (channel) from a device connected to the second communication network (cloud 6) to a device connected to the first communication network (LAN 4) is involved. Therefore, the document server 5 does not directly set up a channel with the image forming device 1 with which a channel has already been closed. Thus, the document server 5 gives the command described above to the terminal device 2 with which a channel has been set up.

Upon receipt of the command described above from the document server 5, the terminal device 2 requests the image forming device 1 via the relay device 3 to cancel the power saving state (step S616). That is, the controller 21 of the terminal device 2 is an example of a second request unit that requests the information processing device to cancel the power saving mode in accordance with the command given by the second command unit. Upon receipt of a request for canceling the power saving state, the image forming device 1 cancels the power saving mode (step S617), and requests the document server 5 to set up a channel (step S618). That is, the controller 11 of the image forming device 1 is an example of a cancellation unit that cancels the power saving mode in accordance with a request given by the second request unit and that sets up a communication path with the server device. In other words, the controller 11 is an example of a first acquisition unit that acquires a request for canceling the power saving mode from the server device for which a communication path with the information processing device (image forming device 1) is closed via the terminal device for which a communication path with the server device is not closed, and is also an example of a cancellation unit that cancels the power saving mode in accordance with the request acquired by the first acquisition unit and that sets up a communication path with the server device. After that, when a channel is set up, the image forming device 1 transmits the user certificate data 121 stored in the memory 12 to the document server 5 as a user certificate (step S619). The document server 5 authenticates the received user certificate data 121 (step S620). Upon acceptance of the user certificate data 121, the document server 5 refers to the image data storage area 525, and notifies the image forming device 1 of the number of pieces of image data that have not been transmitted (step S621). The image forming device 1 notified of the number of pieces of image data that have not been transmitted requests the document server 5 to send image data until the number of pieces of image data that have not been transmitted becomes (step S622), and receives image data from the document server 5 (step S623).

Accordingly, the document server 5 receives requests from the image forming device 1 to set up and close a channel, and stores the communication state with the image forming device 1 and the state of the image forming device 1 in accordance with the requests. In response to an instruction from the terminal device 2 to form an image when the image forming device 1 is in the power saving mode and when the channel established between the document server 5 and the image forming device 1 is closed, the document server 5 commands the terminal device 2 to request the image forming device 1 to cancel the power saving mode. It is guaranteed that the request for canceling the power saving mode has not been forwarded from a device connected to a global area network to a device connected to a local area network at least when setting up of a channel is involved, because of the following reason. If setting up of a communication path from a device connected to the second communication network to a device connected to the first communication network is involved, the relay device 3 does not relay communication, and the communication also includes communication having content common to the request given by the second request unit. Therefore, after commanding the terminal device 2 to send the above request, upon receipt of a request for setting up a channel that is involved with the cancellation of the power saving mode from the image forming device 1, the document server 5 estimates that the image forming device 1 and the terminal device 2 are located comparatively near, and also determines that the image forming device 1 is under control of the user who operates the terminal device 2 and who is guaranteed to be a human. Thus, the document server 5 permits the image forming device 1 to form the image corresponding to the document data.

Further, if no job is sent for a certain period, the image forming device 1 closes the channel between the image forming device 1 and the document server 5, and causes a transition to the power saving mode. Therefore, the power consumption of the image forming device 1 may be saved.

6. Modifications

While exemplary embodiments have been described, the exemplary embodiments may be modified as follows. The following modifications and the first to fifth exemplary embodiments described above may also be used in combination.

6-1. First Modification

In the foregoing exemplary embodiments, the cloud 6 includes one document server 5. The cloud 6 may include plural server devices and the like, and these devices may cooperate to provide plural services.

For example, the cloud 6 may include a master server and plural slave servers. When a request for editing a document is sent from the terminal device 2, the master server may receive the request, search for a slave server available for processing at this time, and allocate the slave server to the document editing process. Alternatively, functionality for a document editing or image forming instruction may be divided into plural functions, and each function may be allocated to a slave server that is to execute the function. For example, the function of recording the editing operation log, the function of holding the state of a document, the function of canceling the editing operation (or "undo" function), the retry function (or "redo" function), and the function of generating image data corresponding to document data may be performed by different servers. In this manner, even if a virtual document server is established using a combination of plural devices, users may access the variety of services regarding documents as described above.

6-2. Second Modification

In the foregoing exemplary embodiments, the LAN 4 includes one relay device 3. However, the functions implemented by the relay device 3 may be implemented using a combination of plural devices. For example, the functions of the relay device 3 may be implemented by using a router, a firewall server, and a proxy server in combination. That is, the relay device 3 may be configured to more strongly limit the access to the LAN 4 from the cloud 6 than the access between devices in the LAN 4.

6-3. Third Modification

In the foregoing fourth exemplary embodiment, the document server 5 encrypts a generated pseudo-random number using the public key owned by the document server 5 to generate a single-use alternative key. When the alternative key is transmitted from the image forming device 1, the document server 5 decodes the alternative key using the private key owned by the document server 5 to authenticate whether or not the alternative key is authentic. However, a public key or a private key may not necessarily be used for the generation and authentication of an alternative key. For example, if encrypted communication is established between the document server 5 and the terminal device 2 and between the document server 5 and the image forming device 1, an alternative key may not necessarily be encrypted as long as the alternative key is unpredictable.

Additionally, an alternative key may not necessarily be generated by the document server 5. For example, the document server 5 may store plural predetermined alternative keys in the memory 52, and, in step S501, described above, may select one of the plural alternative keys and transmit the selected alternative key to the terminal device 2. An alternative key may be selected in accordance with, for example, a generated pseudo-random number.

6-4. Fourth Modification

In the foregoing fifth exemplary embodiment, the document server 5 commands the terminal device 2 to request the image forming device 1 to cancel its power saving state. The above command may be created using encryption or using a signature given in the fourth exemplary embodiment. That is, the document server 5 may be configured to, after sending a the power saving state cancellation request including content interpretable by the document server 5 to the terminal device 2, decode the same content, which is included in a channel setup request received by the document server 5 from the image forming device 1, thereby determining that the command has been sent from the terminal device 2 to the image forming device 1 via a local area network and permitting the image forming device 1 to transmit image data.

6-5. Fifth Modification

In the foregoing exemplary embodiments, IP addresses used to specify the locations of individual devices comply with IPv4. However, information for specifying the locations of individual devices is not limited to the above IP addresses. For example, IP addresses complying with Internet Protocol Version 6 (IPv6) may be used, or universally unique identifiers (UUIDs) may be used. In this case, the relay device 3 may not necessarily perform network address translation as long as the relay device 3 relays communication between the LAN 4 and the cloud 6, and the memory 32 may not necessarily store the address translation table 321.

6-6. Sixth Modification

In the foregoing first or second exemplary embodiment, the terminal device 2 that has received a proxy-HIP request from the image forming device 1 notifies the document server 5 that the terminal device 2 transmits a HIP on behalf of the image forming device 1, and the document server 5 requests the terminal device 2 to send a HIP in accordance with the notification. Alternatively, in step S207, the image forming device 1 may transfer the CAPTCHA-based test, which has been transmitted from the document server 5, to the terminal device 2 together with the proxy-HIP request sent from the image forming device 1 to the terminal device 2. In this case, the terminal device 2 may present the transferred test to the user and may send a response to the document server 5 in accordance with the operation of the user.

6-7. Seventh Modification

In the foregoing fifth exemplary embodiment, upon receipt of a request for canceling the power saving state, the image forming device 1 cancels the power saving mode, and requests the document server 5 to set up a channel. Alternatively, the document server 5 may request the image forming device 1 to send a HIP as in step S202 after the channel is set up. In this case, the communication unit 13 and the controller 11 of the image forming device 1 are examples of a receiving unit that receives a test for authenticating whether or not the information processing device is being operated by a human or receives a request for making a response to the test after the cancellation unit sets up a communication path with the server device. Then, subsequently to step S202, an operation illustrated in any of the first to fourth exemplary embodiments may be performed.

6-8. Eighth Modification

In the foregoing exemplary embodiments, the controller 51 of the document server 5 functions as the user authentication unit 512 that matches user certificate data received via the communication unit 53 with the content stored in the user certificate DB 521 and that performs user identity authentication. However, the above function may be omitted in an information processing system such as the illustrated image forming system 9 if only HIP-based authentication is required but user identity authentication is not necessarily required.

6-9. Ninth Modification

The individual programs executed by the controller 11 of the image forming device 1 may be provided in such a manner that the programs are stored in computer device readable recording media including magnetic recording media such as magnetic tapes and magnetic disks, optical recording media such as optical disks, magneto-optical recording media, and semiconductor memories. The programs may also be downloaded via networks such as the Internet. Examples of the controller which has been implemented as the controller 11 by way of example may include a variety of devices other than a CPU, and a dedicated processor.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing system comprising:
   an image forming device connected to a first communication network;
   a terminal device connected to the first communication network; and
   a server device connected to a second communication network different from the first communication network, the server device communicating with the image forming device and the terminal device,
   the server device including
      a receiving unit that receives an instruction from the terminal device to provide the image forming device with a predetermined service,
      a first request unit that presents a test to the image forming device to authenticate whether or not the image forming device is being operated by a human and that sends a request to make a response to the test to the image forming device, and
      a providing unit wherein if a proof that the image forming device that has sent the response to the first request unit is being operated by the human is to be rejected on the basis of the response sent from the image forming device to the first request unit or on the basis of no response within a predetermined period, the image forming device requests the terminal device to make a response to the test on behalf of the image forming device, and
   when the terminal device makes the response to the test on behalf of the image forming device, the providing unit provides the image forming device with the predetermined service in accordance with the instruction,
   the terminal device including
      an instruction unit that sends the instruction to the server device, and
      a response unit that makes a response to the test on behalf of the image forming device in accordance with a user operation if the image forming device is requested by the first request unit to make a response to the test,
   wherein in response to the image forming device receiving the request from the server device, the image forming device analyzes the request, and
   wherein in response to the request including a human interactive proof (HIP) request, the image forming device requests the terminal device to make a response to the test by proxy without sending a response to the server device.

2. The information processing system according to claim 1, further comprising a relay device that relays communication among the image forming device, the terminal device, and the server device,
   wherein the server device includes a notification unit that notifies the image forming device that a proof that the image forming device that has sent a response to the first request unit is being operated by a human is to be rejected on the basis of a response sent from the image forming device to the first request unit or on the basis of no response within a predetermined period, wherein the image forming device includes a request unit that requests the terminal device to make a response to the test by proxy if the notification sent from the notification unit is detected, wherein the response unit makes a response to the test if the terminal device is requested by the request unit to make a response to the test by proxy, and wherein the relay device does not relay communication having content common to a request made by the request unit, except when the communication is established between two devices connected to the first communication network.

3. The information processing system according to claim 1, further comprising a relay device that relays communication among the image forming device, the terminal device, and the server device, wherein the image forming device includes a request unit that requests the terminal device to make a response to the test by proxy if the test is presented from the first request unit, wherein the response unit makes a response to the test if the terminal device is requested by the request unit to make a response to the test by proxy, and wherein the relay device does not relay communication having content common to a request made by the request unit, except when the communication is established between two devices connected to the first communication network.

4. The information processing system according to claim 1, wherein the server device includes a request unit that requests the terminal device to make a response to the test by proxy if a proof that the image forming device that has sent a response to the first request unit is being operated by a human is to be rejected on the basis of a response sent from the image forming device to the first request unit or on the basis of no response within a predetermined period, and wherein the response unit makes a response to the test if the terminal device is requested by the request unit to make a response to the test by proxy.

5. The information processing system according to claim 1, wherein the server device includes a first command unit that, if a proof that the image forming device that has sent a response to the first request unit is being operated by a human is to be rejected on the basis of a response sent from the image forming device to the first request unit or on the basis of no response within a predetermined period, transmits an alternative key serving as an alternative to the proof to the terminal device and commands the terminal device to distribute the alternative key to the image forming device, wherein the response unit distributes the alternative key to the image forming device in accordance with a command given by the first command unit, instead of making a response to the test, and wherein the providing unit provides the image forming device with the service upon receipt of, from the image forming device, the alternative key transmitted to the terminal device in accordance with a command given by the first command unit.

6. An information processing system comprising:

an information processing device connected to a first communication network;

a terminal device connected to the first communication network; and a server device connected to a second communication network different from the first communication network, the server device communicating with the information processing device and the terminal device, the server device including a receiving unit that receives an instruction from the terminal device to provide the information processing device with a predetermined service, a first request unit that presents a test to the information processing device to authenticate whether or not the information processing device is being operated by a human and that sends a request to make a response to the test to the information processing device, and a providing unit that provides the information processing device with the service in accordance with the instruction received by the receiving unit if a device that has sent a response to the first request unit is being operated by a human, the terminal device including an instruction unit that sends the instruction to the server device, and a response unit that makes a response to the test on behalf of the information processing device in accordance with a user operation if the information processing device is requested by the first request unit to make a response to the test;

a relay device that relays communication among the information processing device, the terminal device, and the server device, wherein the server device includes a second command unit that commands the terminal device to request the information processing device to cancel a power saving mode for reducing power consumption if a communication path established between the server device and the information processing device is closed when the receiving unit receives the instruction, wherein the terminal device includes a second request unit that requests the information processing device to cancel the power saving mode in accordance with a command given by the second command unit, wherein the information processing device includes a transition unit that closes the communication path established between the server device and the information processing device and that causes a transition to the power saving mode, and a cancellation unit that cancels the power saving mode in accordance with a request given by the second request and that sets up a communication path between the information processing device and the server device, and wherein the relay device does not relay communication having content common to a request made by the second request unit if setting up of a communication path from a device connected to the second communication network to a device connected to the first communication network is involved.

7. The information processing system according to claim 1, wherein the providing unit provides the image forming device with image data representing an image in accordance with the instruction, and wherein the image forming device includes an image forming unit that forms the image represented by the provided image data on a recording medium.

8. An image forming device comprising:
a communication unit that communicates with a relay device that relays communication established between a terminal device connected to a first communication network and a server device connected to a second communication network different from the first communication network;
a receiving unit that receives a test and a request for making a response to the test via the communication unit from the server device that has received an instruction from the terminal device to provide a predetermined service, the test being a test for authenticating whether or not a device that has made a response to the test is being operated by a human;
a request unit that requests the terminal device via the communication unit to make a response to the test by proxy if the receiving unit receives the test or the request; and
a providing unit, wherein if a proof that the communication unit that has sent the response to the request unit is being operated by the human is to be rejected on the basis of the response sent from the communication unit to the request unit or on the basis of no response within a predetermined period, the communication unit requests the terminal device to make a response to the test on behalf of the communication unit, and
when the terminal device makes the response to the test on behalf of the communication unit, the providing unit provides the communication unit with the predetermined service in accordance with the instruction,
wherein in response to the image forming device receiving the request from the server device, the image forming device analyzes the request, and
wherein in response to the request including a human interactive proof (HIP) request, the image forming device requests the terminal device to make a response to the test by proxy without sending a response to the server device.

9. The image forming device according to claim 8, wherein the relay device does not relay communication having content common to a request made by the request unit, except when the communication is established between two devices connected to the first communication network, and
wherein the request unit requests the terminal device to make a response to the test by proxy upon receipt of a notification from the server device that a proof that a device that has made a response to the test is being operated by a human is to be rejected.

10. The image forming device according to claim 8, wherein the relay device does not relay communication having content common to a request made by the request unit, except when the communication is established between two devices connected to the first communication network, and
wherein the request unit requests the terminal device to make a response to the test by proxy if the test is presented from the server device.

11. The image forming device according to claim 8, wherein, after the receiving unit receives the test or the request, if the server device rejects a proof that a device that has made a response to the test is being operated by a human on the basis of a response sent from the image forming device or on the basis of no response within a predetermined period, the request unit acquires an alternative key serving as an alternative to the proof from the server device via the terminal device, instead of sending a request for making a response to the test by proxy, and transmits the acquired alternative key to the server device.

12. An information processing system comprising:
an information processing device connected to a first communication network;
a terminal device connected to the first communication network; and
a server device connected to a second communication network different from the first communication network, the server device communicating with the information processing device and the terminal device,
the server device including
a receiving unit that receives an instruction from the terminal device to provide the information processing device with a predetermined service,
a first request unit that presents a test to the information processing device to authenticate whether or not the information processing device is being operated by a human and that sends a request to make a response to the test to the information processing device, and
a providing unit that provides the information processing device with the service in accordance with the instruction received by the receiving unit if a device that has sent a response to the first request unit is being operated by a human,
the terminal device including
an instruction unit that sends the instruction to the server device, and
a response unit that makes a response to the test on behalf of the information processing device in accordance with a user operation if the information processing device is requested by the first request unit to make a response to the test,
wherein a relay device does not relay a request for canceling a power saving mode for reducing power consumption if setting up of a communication path from a device connected to the second communication network to a device connected to the first communication network is involved, and
wherein the information processing device further comprises
a transition unit that closes a communication path established between the information processing device and the server device and that causes a transition to the power saving mode,
a first acquisition unit that acquires a request for canceling the power saving mode from the server device, for which the communication path established with the information processing device is closed, via the terminal device, for which a communication path established with the server device is not closed, and
a cancellation unit that cancels the power saving mode in accordance with the request acquired by the first acquisition unit and that sets up a communication path between the information processing device and the server device, and
wherein the receiving unit receives the test or the request after the cancellation unit has set up a communication path between the information processing device and the server device.

13. The image forming device according to claim 8, further comprising:
a second acquisition unit that acquires image data representing an image from the server device in accordance with the instruction if the server device accepts a proof that a device that has made a response to the test is being operated by a human on the basis of a response made by the terminal device by proxy in response to a request sent from the request unit; and an image forming unit that forms an image on a recording medium in accordance with the acquired image data.

14. A server device comprising:

a receiving unit that receives an instruction from a terminal device connected to a first communication network to provide an image forming device connected to the first communication network with a predetermined service;

a request unit that presents a test to the image forming device to authenticate whether or not a device that has made a response to the test is being operated by a human and that sends a request to make a response to the test to the image forming device; and a providing unit wherein if a proof that the image forming device that has sent the response to the request unit is being operated by the human is to be rejected on the basis of the response sent from the image forming device to the request unit or on the basis of no response within a predetermined period, the image forming device requests the terminal device to make a response to the test on behalf of the image forming device, and when the terminal device makes the response to the test on behalf of the information forming device, the providing unit provides the image forming device with the predetermined service in accordance with the instruction, the server device being connected to a second communication network different from the first communication network, wherein in response to the image forming device receiving the request from the server device, the image forming device analyzes the request, and wherein in response to the request including a human interactive proof (HIP) request, the image forming device requests the terminal device to make a response to the test by proxy without sending a response to the server device.

15. A method comprising:

communicating with a relay device via a communication unit, the relay device relaying communication established between a terminal device connected to a first communication network and a server device connected to a second communication network different from the first communication network;

receiving a test and a request for making a response to the test via the communication unit from the server device that has received an instruction from the terminal device to provide a predetermined service, the test being a test for authenticating whether or not a device that has made a response to the test is being operated by a human;

requesting the terminal device via the communication unit to make a response to the test by proxy upon receipt of the test or the request;

requesting the terminal device to make a response to the test if a proof that the test is being operated by the human is to be rejected on the basis of the sent response to the test or on the basis of no response within a predetermined period; and providing the predetermined service in accordance with the instruction when the terminal device makes a response to the test, wherein in response to the receiving the request from the server device, analyzing the request, and wherein in response to the request including a human interactive proof (HIP) request, requesting the terminal device to make a response to the test by proxy without sending a response to the server device.

* * * * *